United States Patent
Rollin, Jr. et al.

(10) Patent No.: US 10,106,676 B2
(45) Date of Patent: Oct. 23, 2018

(54) PROPYLENE-BASED POLYMERS HAVING IMPROVED STABILITY AND METHODS FOR PRODUCING THE SAME

(71) Applicant: ExxonMobil Chemical Patents Inc., Baytown, TX (US)

(72) Inventors: Paul E. Rollin, Jr., Porter, TX (US); Narayanaswami Dharmarajan, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/127,814

(22) PCT Filed: May 8, 2015

(86) PCT No.: PCT/US2015/029899
§ 371 (c)(1),
(2) Date: Sep. 21, 2016

(87) PCT Pub. No.: WO2015/191195
PCT Pub. Date: Dec. 17, 2015

(65) Prior Publication Data
US 2017/0107367 A1    Apr. 20, 2017

Related U.S. Application Data

(60) Provisional application No. 62/010,253, filed on Jun. 10, 2014.

(51) Int. Cl.
*C08L 23/14*    (2006.01)
*C08K 5/32*     (2006.01)
*C08K 5/3435*   (2006.01)

(52) U.S. Cl.
CPC ............. *C08L 23/142* (2013.01); *C08K 5/32* (2013.01); *C08K 5/3435* (2013.01); *C08L 2201/08* (2013.01); *C08L 2205/025* (2013.01)

(58) Field of Classification Search
CPC ............. C08L 23/142; C08L 2201/08; C08L 2205/025
See application file for complete search history.

(56) References Cited

U.S. PATENT DOCUMENTS

| | | |
|---|---|---|
| 4,876,300 A | 10/1989 | Seltzer et al. |
| 5,844,029 A | 12/1998 | Prabhu et al. |
| 5,880,191 A | 3/1999 | Prabhu et al. |
| 5,922,794 A | 7/1999 | Prabhu et al. |
| 6,103,798 A | 8/2000 | Prabhu et al. |
| 6,881,800 B2 | 4/2005 | Friedersdorf |
| 7,163,989 B2 | 1/2007 | Friedersdorf |
| 7,232,871 B2 | 6/2007 | Datta et al. |
| 7,803,876 B2 | 9/2010 | Yeh et al. |
| 8,013,069 B2 | 9/2011 | Harrington et al. |
| 8,026,323 B2 | 9/2011 | Datta et al. |
| 2002/0086924 A1 | 7/2002 | King, III |
| 2003/0060543 A1 | 3/2003 | Seip et al. |
| 2004/0147650 A1 | 7/2004 | Zahalka et al. |
| 2011/0172382 A1 | 7/2011 | Yeh et al. |
| 2016/0244591 A1* | 8/2016 | Andrews ............... C08L 23/12 |

FOREIGN PATENT DOCUMENTS

| | | |
|---|---|---|
| WO | 2011/087729 | 7/2011 |
| WO | 2011/087730 | 7/2011 |
| WO | 2011/087731 | 7/2011 |

OTHER PUBLICATIONS

Cheng, "C NMR Analysis of Ethylene-Propylene Rubbers," Macromolecules, 1984, vol. 17, pp. 1950-1955.
Wheeler et al., "Gel Permeation Chromatography/Fourier Transform Infrared Interface for Polymer Analysis," Applied Spectroscopy, vol. 47, No. 9, 1993, pp. 1128-1130.

* cited by examiner

*Primary Examiner* — Robert D. Harlan

(57) ABSTRACT

Provided herein are compositions comprising propylene-based polymers having improved stability and methods for producing the same. The composition comprises a propylene-based polymer that has a melting temperature of less than 120° C. and a heat of fusion of less than 75 J/g and comprises propylene-derived units and 5-30 wt % of α-olefin-derived units. The stabilizer comprises an amine oxide.

6 Claims, 5 Drawing Sheets

PROPYLENE-BASED POLYMERS HAVING IMPROVED STABILITY AND METHODS FOR PRODUCING THE SAME

CROSS REFERENCE TO RELATED APPLICATIONS

This present application is a National Stage Application of International Application No. PCT/US2015/029899, filed May 8, 2015, which claims priority to and the benefit of U.S. Provisional Application No. 62/010,253, filed Jun. 10, 2014, which are incorporated herein by reference in their entireties.

PRIORITY CLAIM

This application claims priority to and the benefit of U.S. Provisional Application No. 62/010,253, filed Jun. 10, 2014, which is incorporated herein by reference in its entirety.

FIELD OF THE INVENTION

This invention relates to propylene-based polymers having improved stability and methods for producing the same.

BACKGROUND OF THE INVENTION

Propylene-based polymers are well known in the art for their usefulness in a variety of applications, including use in packaging, films, and nonwoven fabrics. Often a stabilizer or antioxidant is added to the polymer during the manufacturing or processing process to prevent oxidation of the polymer during storage and use. Nevertheless, plastics derived from propylene-based polymers are known to discolor over time. The discoloration can be readily apparent in end-use applications having large surface area, such as packaging, films, or nonwovens, and may give the end-use product an undesirable appearance.

The discoloration of the polymer can result from the use of antioxidants, such as phenolic antioxidants, that are added to provide processing stability to the polymer. As the phenolic antioxidant functions to capture radicals that are formed on the polymer chain, the phenolic additive degrades and the degradation product is often colored. For example, polymers or articles derived from those polymers where phenolic antioxidants are used as stabilizers are often stored for extended periods of time and are likely exposed to oxides of nitrogen (NOx) gases, such as NOx gases generated from natural gas heaters or gas-powered forklifts. As the phenolic antioxidant captures the radicals that are formed on the polymer as a result of NOx gas exposure, an intense red color arises from the antioxidant that makes the polymer/article appear pink and is referred to as "pinking" of the polymer.

Oxidation, and thus discoloration of the polymer, may also be enhanced by processing conditions such as high heat or excessive melt shearing. Additionally, the presence of other additives such as colorants, UV stabilizers, or slip agents, may also increase the likelihood of discoloration, and may lead to other types of discoloration such as yellowing or browning of the polymer.

U.S. Pat. Nos. 6,881,800 and 7,163,989 and PCT Publications WO 2011/087729; and WO 2011/087730 describe processes and apparatuses for the continuous solution polymerization of olefins including ethylene, propylene, and other olefin commoners. PCT Publication WO 2011/087731 describes the addition of stabilizer to the polymer at a location downstream of the reactor.

U.S. Pat. Nos. 5,844,029; 5,880,191; 5,922,794; and 6,103,798 describe polymer compositions admixed with hydrocarbon amine oxide stabilizer compositions.

U.S. Pat. No. 4,876,300 describes polyolefin compositions stabilized with long chain N,N-dialkylhydroxylamines. U.S. Patent Application Publication No. 2002/0086924 describes stabilized gamma irradiated polyolefins.

There remains a need for propylene-based polymers with improved stability and that have reduced discoloration, for example, reduced pinking, yellowing, and/or browning. There also remains a need for a process to introduce stabilizer into polymer in an effective way that is also compatible with the polymerization and finishing processes for producing the polymer.

SUMMARY OF THE INVENTION

Figure 1:
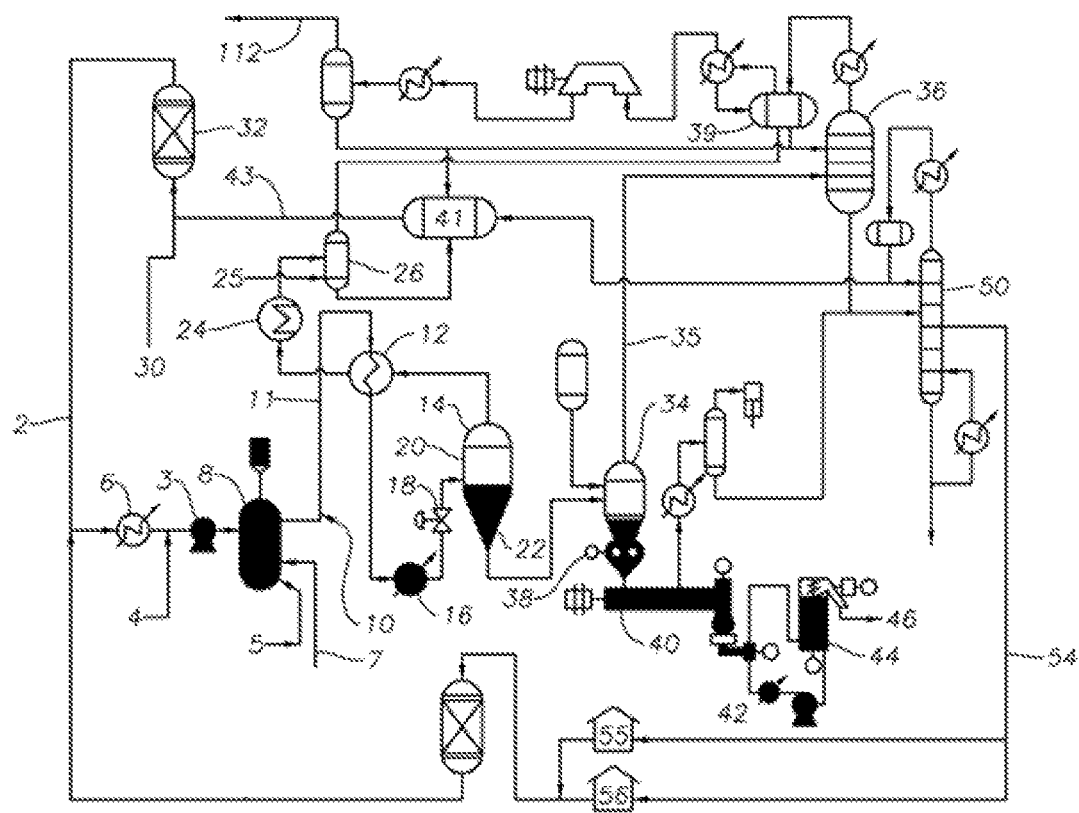
FIG. 1 illustrates a schematic layout for a polymerization plant for producing propylene-based polymers.

Provided herein are compositions comprising propylene-based polymers having improved stability and methods for producing the same.

The composition comprises a propylene-based polymer and a stabilizer, wherein the propylene-based polymer comprises propylene-derived units and 5-30 wt % of α-olefin-derived units and where the propylene-based polymer has a melting temperature of less than 120° C. and a heat of fusion of less than 75 J/g; wherein the stabilizer comprises an amine oxide; and wherein the composition has a change in MFR (ΔMFR) of less than 35% in an MFR multi-pass test, where the change in MFR is calculated as:

$$\Delta MFR = 100 \times ((MFR_{1st} - MFR_{3rd})/MFR_{1st})$$

where the $MFR_{1st}$ is the MFR of the composition after the first pelletization step of the MFR multi-pass test and the $MFR_{3rd}$ is the MFR of the composition after the third pelletization step of the MFR multi-pass test; and wherein the composition has a yellowness index (YI) of less than 5 after five days exposure during a burnt gas exposure test.

DETAILED DESCRIPTION OF THE INVENTION

Described herein are propylene-based polymers having improved stability and methods for producing the same. The stability of the propylene-based polymer is improved by the addition of a stabilizer, such as an amine oxide. The stabilizer may be compounded with the polymer or more preferably, is introduced into the polymer polymerization and finishing process. For example, the stabilizer may be introduced into the polymer polymerization and finishing process in a solution or as a molten liquid.

The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic, and random symmetries.

As used herein, the term "copolymer" is meant to include polymers having two or more monomers, optionally, with other monomers, and may refer to interpolymers, terpolymers, etc.

The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit".

"Polypropylene," as used herein, includes homopolymers and copolymers of propylene or mixtures thereof. Products that include one or more propylene monomers polymerized with one or more additional monomers may be more commonly known as random copolymers (RCP) or impact copolymers (ICP). Impact copolymers may also be known in the art as heterophasic copolymers.

"Propylene-based," as used herein, is meant to include any polymer comprising propylene, either alone or in combination with one or more comonomers, in which propylene is the major component (i.e., the polymer contains greater than 50 wt % propylene-derived units).

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another in series reactors, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. Another method of visbreaking is the addition of a prodegradant to the polymer. A prodegradant is a substance that promotes chain scission when mixed with a polymer, which is then heated under extrusion conditions. Examples of prodegradants that may be used include peroxides, such as alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

As used herein, a "catalyst system" comprises at least a transition metal compound, also referred to as catalyst precursor, and an activator. An "activator" is any compound or component, or combination of compounds or components, capable of enhancing the ability of one or more catalysts to polymerize monomers to polymers. Contacting the transition metal compound (catalyst precursor) and the activator in solution upstream of the polymerization reactor or in the polymerization reactor of the disclosed processes yields the catalytically active component (catalyst) of the catalyst system. Such catalyst systems may optionally include impurity scavengers.

As used herein, "nonwoven fabric" means a web structure of individual fibers or filaments that are interlaid, but not in an identifiable manner as in a knitted fabric.

Propylene-Based Polymers

The compositions described herein comprise one or more propylene-based polymers, such as propylene-based elastomers ("PBEs"). The propylene-based polymer comprises propylene and from about 5 to about 30 wt % of one or more comonomers selected from ethylene and/or $C_4$-$C_{12}$ α-olefins. For example, the comonomer units may be derived from ethylene, butene, pentene, hexene, 4-methyl-1-pentene, octene, or decene. In preferred embodiments, the comonomer is ethylene. In some embodiments, the propylene-based polymer consists essentially of propylene and ethylene, or consists only of propylene and ethylene. Some of the embodiments described below are discussed with reference to ethylene as the comonomer, but the embodiments are equally applicable to propylene-based polymers with other α-olefin comonomers. In this regard, the copolymers may simply be referred to as propylene-based polymer with reference to ethylene as the α-olefin.

The propylene-based polymer may include at least about 5 wt %, at least about 6 wt %, at least about 7 wt %, at least about 8 wt %, at least about 9 wt %, at least about 10 wt %, at least about 12 wt %, or at least about 15 wt %, α-olefin-derived units, where the percentage by weight is based upon the total weight of the propylene-derived and α-olefin-derived units. The propylene-based polymer may include up to about 30 wt %, up to about 25 wt %, up to about 22 wt %, up to about 20 wt %, up to about 19 wt %, up to about 18 wt %, or up to about 17 wt %, α-olefin-derived units, where the percentage by weight is based upon the total weight of the propylene-derived and α-olefin-derived units. In some embodiments, the propylene-based polymer may comprise from about 5 wt % to about 30 wt %, from about 6 wt % to about 25 wt %, from about 7 wt % to about 20 wt %, from about 10 wt % to about 19 wt %, from about 12 wt % to about 18 wt %, or from about 15 wt % to about 17 wt %, α-olefin-derived units, where the percentage by weight is based upon the total weight of the propylene-derived and α-olefin-derived units.

The propylene-based polymer may include at least about 70 wt %, at least about 75 wt %, at least about 78 wt %, at least about 80 wt %, at least about 81 wt %, at least about 82 wt %, or at least about 83 wt %, propylene-derived units, where the percentage by weight is based upon the total weight of the propylene-derived and α-olefin derived units. The propylene-based polymer may include up to about 95 wt %, up to about 94 wt %, up to about 93 wt %, up to about 92 wt %, up to about 91 wt %, up to about 90 wt %, up to about 88 wt %, or up to about 85 wt %, propylene-derived units, where the percentage by weight is based upon the total weight of the propylene-derived and α-olefin derived units.

The propylene-based polymers can be characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the propylene-based polymer (as determined by DSC) may be less than about 120° C., less than about 115° C., less than about 110° C., or less than about 105° C.

The propylene-based polymer can be characterized by its heat of fusion (Hf), as determined by DSC. The propylene-based polymer may have an Hf that is at least about 0.5 J/g, at least about 1.0 J/g, at least about 1.5 J/g, at least about 3.0 J/g, at least about 4.0 J/g, at least about 5.0 J/g, at least about 6.0 J/g, or at least about 7.0 J/g. The propylene-based polymer may be characterized by an Hf of less than about 75 J/g, less than about 70 J/g, less than about 60 J/g, or less than about 50 J/g.

As used herein, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is again cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

The propylene-based polymer can have a triad tacticity of three propylene units (mmm tacticity), as measured by $^{13}C$ NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity may be determined by the methods described in U.S. Pat. No. 7,232,871.

The propylene-based polymer may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index, m/r, may be calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The propylene-based polymer may have a percent crystallinity of from about 0.5% to about 40%, from about 1% to about 30%, or from about 5% to about 25%, determined according to DSC procedures. Crystallinity may be determined by dividing the Hf of a sample by the Hf of a 100% crystalline polymer, which is assumed to be 189 J/g for isotactic polypropylene.

The propylene-based polymer has a density of from about 0.84 g/cm³ to about 0.92 g/cm³, from about 0.85 g/cm³ to about 0.90 g/cm³, or from about 0.85 g/cm³ to about 0.87 g/cm³ at room temperature, as measured per the ASTM D-1505 test method.

The propylene-based polymer can have a melt index (MI) (ASTM D-1238, 2.16 kg @ 190° C.), of less than or equal to about 100 g/10 min, less than or equal to about 50 g/10 min, less than or equal to about 25 g/10 min, less than or equal to about 10 g/10 min, less than or equal to about 8.0 g/10 min, less than or equal to about 5.0 g/10 min, or less than or equal to about 3.0 g/10 min.

The propylene-based polymer may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The propylene-based polymer may have an MFR less than about 100 g/10 min, less than about 50 g/10 min, less than about 25 g/10 min, less than about 15 g/10 min, less than about 10 g/10 min, less than about 7 g/10 min, or less than about 5 g/10 min. In some embodiments, the propylene-based polymer may have an MFR from about 0.5 to about 10 g/10 min, from about 1.0 to about 7 g/10 min, or from about 1.5 to about 5 g/10 min.

The propylene-based polymer may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The propylene-based polymer may have a weight average molecular weight (Mw), as measured by DRI, of from about 50,000 to about 1,000,000 g/mol, or from about 75,000 to about 500,000 g/mol, from about 100,000 to about 350,000 g/mol, from about 125,000 to about 300,000 g/mol, from about 150,000 to about 275,000 g/mol, or from about 200,000 to about 250,000 g/mol.

The propylene-based polymer may have a number average molecular weight (Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 100,000 to about 150,000 g/mol.

The propylene-based polymer may have a z-average molecular weight (Mz), as measured by MALLS, of from about 50,000 to about 1,000,000 g/mol, or from about 75,000 to about 500,000 g/mol, or from about 100,000 to about 400,000 g/mol, from about 200,000 to about 375,000 g/mol, or from about 250,000 to about 350,000 g/mol.

The molecular weight distribution (MWD, equal to Mw/Mn) of the propylene-based polymer may be from about 0.5 to about 20, from about 0.75 to about 10, from about 1.0 to about 5, from about 1.5 to about 4, or from about 1.8 to about 3.

Optionally, the propylene-based polymer may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD); and combinations thereof. In embodiments where the propylene-based polymer comprises a diene, the diene may be present at from 0.05 wt % to about 6 wt %, from about 0.1 wt % to about 5.0 wt %, from about 0.25 wt % to about 3.0 wt %, or from about 0.5 wt % to about 1.5 wt %, diene-derived units, where the percentage by weight is based upon the total weight of the propylene-derived, α-olefin derived, and diene-derived units.

Optionally, the propylene-based polymer may be grafted (i.e., "functionalized") using one or more grafting monomers. As used herein, the term "grafting" denotes covalent bonding of the grafting monomer to a polymer chain of the propylene-based polymer. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo (2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo (2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt % to about 6 wt %, at least about 0.5 wt %, or at least about 1.5 wt %.

In preferred embodiments, the propylene-based polymer is a reactor blended polymer as defined herein. That is, in preferred embodiments, the propylene-based polymer is a reactor blend of a first polymer component and a second polymer component. Thus, the comonomer content of the propylene-based polymer can be adjusted by adjusting the comonomer content of the first polymer component, adjusting the comonomer content of second polymer component, and/or adjusting the ratio of the first polymer component to the second polymer component present in the propylene-based polymer.

In embodiments where the propylene-based polymer is a reactor blended polymer, the α-olefin content of the first polymer component ("R$_1$") may be greater than 5 wt % α-olefin, greater than 7 wt % α-olefin, greater than 10 wt % α-olefin, greater than 12 wt % α-olefin, greater than 15 wt % α-olefin, or greater than 17 wt % α-olefin, where the percentage by weight is based upon the total weight of the propylene-derived and α-olefin-derived units of the first polymer component. The α-olefin content of the first polymer component may be less than 30 wt % α-olefin, less than 27 wt % α-olefin, less than 25 wt % α-olefin, less than 22 wt % α-olefin, less than 20 wt % α-olefin, or less than 19 wt % α-olefin, where the percentage by weight is based upon the total weight of the propylene-derived and α-olefin-derived units of the first polymer component. In some embodiments, the α-olefin content of the first polymer component may range from 5 wt % to 30 wt % α-olefin, from 7 wt % to 27 wt % α-olefin, from 10 wt % to 25 wt % α-olefin, from 12 wt % to 22 wt % α-olefin, from 15 wt % to 20 wt % α-olefin, or from 17 wt % to 19 wt % α-olefin.

Preferably, the first polymer component comprises propylene and ethylene, and in some embodiments the first polymer component consists only of propylene and ethylene derived units.

In embodiments where the propylene-based polymer is a reactor blended polymer, the α-olefin content of the second polymer component ("$R_2$") may be greater than 1.0 wt % α-olefin, greater than 1.5 wt % α-olefin, greater than 2.0 wt % α-olefin, greater than 2.5 wt % α-olefin, greater than 2.75 wt % α-olefin, or greater than 3.0 wt % α-olefin, where the percentage by weight is based upon the total weight of the propylene-derived and α-olefin-derived units of the second polymer component. The α-olefin content of the second polymer component may be less than 10 wt % α-olefin, less than 9 wt % α-olefin, less than 8 wt % α-olefin, less than 7 wt % α-olefin, less than 6 wt % α-olefin, or less than 5 wt % α-olefin, where the percentage by weight is based upon the total weight of the propylene-derived and α-olefin-derived units of the second polymer component. In some embodiments, the α-olefin content of the second polymer component may range from 1.0 wt % to 10 wt % α-olefin, or from 1.5 wt % to 9 wt % α-olefin, or from 2.0 wt % to 8 wt % α-olefin, or from 2.5 wt % to 7 wt % α-olefin, or from 2.75 wt % to 6 wt % α-olefin, or from 3 wt % to 5 wt % α-olefin. Preferably, the second polymer component comprises propylene and ethylene, and in some embodiments the first polymer component consists only of propylene and ethylene derived units.

In embodiments where the propylene-based polymer is a reactor blended polymer, the propylene-based polymer may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the propylene-based polymer. The propylene-based polymer may comprise from 75 to 99 wt % of the first polymer component, from 80 to 97 wt % of the first polymer component, from 85 to 93 wt % of the first polymer component, or from 82 to 92 wt % of the first polymer component, based on the weight of the propylene-based polymer.

Stabilizer

The stabilizer may have a melting point of greater than 40° C., or greater than 50° C., or greater than 60° C., or greater than 70° C., or greater than 80° C., or greater than 90° C., or greater than 100° C. The stabilizer may have a melting point of 250° C. or less, or 200° C. or less, or 175° C. or less, or 150° C. or less. The stabilizer may have a melting point in the range of from 40° C. to 200° C., for example, in the range of from 50° C. to 150° C.

Preferably the stabilizer used herein is an amine oxide. The amine oxide is preferably a saturated tertiary amine oxide as represented by general Formula (I):

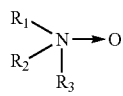

Formula (I)

wherein $R_1$ and $R_2$ are independently each a $C_6$ to $C_{36}$ group that may optionally and independently contain at least one —O—, —$CO_2$—, —CO—, or —CON— moiety. $R_3$ is a $C_1$ to $C_{36}$ group that may also optionally contain at least one —O—, —$CO_2$—, —CO—, or —CON— moiety. Included in the groups for $R_1$, $R_2$, and $R_3$ are benzyl and substituted benzyl groups. It is also possible for each of $R_1$, $R_2$, and $R_3$ to be the same group. $R_1$ and $R_2$ are preferably $C_8$ to $C_{26}$ groups and most preferably $C_{10}$ to $C_{26}$ groups and $R_3$ is preferably $C_1$ to $C_{22}$ groups and most preferably a $C_1$ group (e.g., methyl). Also, preferred amine oxides include those wherein $R_1$, $R_2$, and $R_3$ are the same $C_6$ to $C_{36}$ groups. Preferably, all of the aforementioned groups for $R_1$, $R_2$, and $R_3$ are saturated hydrocarbon groups or saturated hydrocarbon groups containing at least one of the aforementioned —O—, —S—, —SO—, —$CO_2$—CO—, or —CON— moieties.

The saturated amine oxide may also include poly(amine oxides). By poly(amine oxide) is meant tertiary amine oxides containing at least two tertiary amine oxides per molecule. Illustrative poly(amine oxides) (also called "poly (tertiary amine oxides)") include the tertiary amine oxide analogues of aliphatic and alicyclic diamines such as, for example, 1,4-diaminobutane; 1,6-diaminohexane; 1,10-diaminodecane; and 1,4-diaminocyclo hexane, and aromatic based diamines such as, for example, diamino anthraquinones and diaminoanisoles. Also included are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —$CO_2$—, —CO—, or —CON— moiety. In a preferred embodiment, each tertiary amine oxide of the polymeric tertiary amine oxide contains a $C_1$ group.

In some embodiments, the saturated amine oxide is attached to a molecule containing a hindered amine. Hindered amines are known in the art and the amine oxide may be attached to the hindered amine in any manner and structural position of the hindered amine. Useful hindered amines in the present invention include those of the general Formulas (II) and (III):

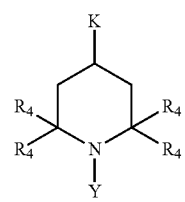

Formula (II)

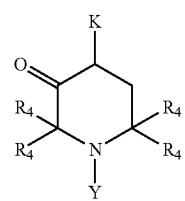

Formula (III)

wherein K is a carbon chain containing the amine oxide (or amine oxides), Y is a $C_{1-30}$ alkyl moiety, a —C(O)R moiety wherein R is a $C_{1-30}$ alkyl group, or a —OR moiety wherein R is a $C_{1-30}$ alkyl group, and each $R_4$ is independently a $C_{1-30}$ alkyl group, preferably a methyl group. Also included are amine oxides containing more than one hindered amine and more than one saturated amine oxide per molecule. The hindered amine may be attached to a poly(tertiary amine oxide) or attached to a polymeric substrate, as discussed above.

In some embodiments, the amine oxide may be a thermal reaction product of tertiary amine oxides. Under elevated temperatures amine oxides including those illustrated by Formula I, are believed to undergo various reactions. The reactions are believed to result in the formation of various products, for example, hydroxyl amines and olefinic species. Amine oxide reaction products containing at least one long chain carbon group are preferred in order to increase the solubility of the reaction products, including the hydroxyl amine-type reaction products, with the propylene-based polymer. When only a single alkyl substituent (i.e., only one of $R_1$, $R_2$, and $R_3$) in the tertiary amine oxide is a $C_6$ to $C_{36}$ group and the other two alkyl substituents are $C_{1-5}$ groups, some of the hydroxyl amine-type reaction products are believed to contain only short chain substituents (i.e., $C_{1-5}$ groups). It is believed that this is a result of some of the long chain groups being eliminated from the amine oxide as an olefinic by-product. In order to insure that at least one long chain is retained in the hydroxyl amine-type thermal reaction products, either all three substituents should preferably be long chain or one chain can be $C_1$ (e.g., methyl) and the other two substituents be long chain (e.g., $C_6$ to $C_{36}$ groups). When one substituent is a $C_1$ group and the other two substituents are long chain groups (including polymeric groups as previously described), the resultant thermal reaction product will be asymmetrical and contain a $C_1$ group and a long chain group. By long chain carbon group is meant from $C_6$ to about $C_{36}$, preferably from $C_8$ to $C_{26}$ and most preferably $C_{10}$ to $C_{22}$. Also included by long chain group are the before mentioned polymeric amine oxide groups. The long chain carbon group may also optionally contain at least one of the before mentioned —O—, —S—, —CO$_2$—, —CO—, or —CON— moieties described for $R_1$, $R_2$, and $R_3$. Hydroxyl amines-type reaction products that do not contain the aforementioned long chain group may tend to migrate out of the polymer resin and can bloom to the surface of the polymer resin or coat the surface of the processing equipment requiring downtime for cleaning and maintenance. Therefore, in some embodiments, useful amine oxides include hydroxyl amines containing at least one long chain carbon group, preferably asymmetrical hydroxyl amines containing a long chain and a short chain; and also include polymeric hydroxyl amines containing at least two hydroxyl amines per molecule.

Preferred saturated amine oxides for use herein include, dioctyimethyl amine oxide, trioctyl amine oxide, didecylmethyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$-$C_{22}$) amine oxide, and di($C_{20}$-$C_{22}$ alkyl) methyl amine oxide. Preferred saturated hydroxyl amines include octyl methyl hydroxyl amine, decyl methyl hydroxyl amine, (coco alkyl) methyl hydroxyl amine, (tallow alkyl) methyl hydroxyl amine, and ($C_{20}$-$C_{22}$ alkyl) methyl hydroxyl amine. By the term "coco alkyl" is meant hydrogenated $C_{12}$-$C_{14}$ alkyl commonly referred to as hydrogenated coconut oil. By the term "tallow alkyl" is meant hydrogenated $C_{16}$-$C_{18}$ alkyl commonly referred to as hydrogenated tallow oil. Hydrogenated tallow oil is described in U.S. Pat. No. 4,876,300. The aforementioned hydrogenated coconut oil and hydrogenated tallow oil do contain some percentage of higher and/or lower carbon chain lengths than are described above and it should be understood that these other fractions are within the scope of the present invention. It is preferred that at least 75% of the carbon chains be within the described ranges for the coconut oil and tallow oil.

Preparation of the Propylene-Based Polymer

The propylene-based polymers are preferably prepared using homogeneous conditions, such as a continuous solution polymerization process. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

An exemplary polymerization plant for producing the propylene-based polymers described herein is illustrated in FIG. 1. In FIG. 1, the shading helps illustrate the parts of the process that are primarily for polymerization and finishing and are typically polymer-rich (those items shaded black) and the parts of the process that are primarily for recycle and monomer recovery and are typically polymer-lean (those items that are not shaded).

With reference to FIG. 1, a feed for polymerization is passed through conduit (2). The feed contains A) solvent, B) monomer, C) comonomer, and, optionally, D) a diene or other polyene or cyclic copolymerizable material. The feed is passed through a chiller or cooler (6), in which the feed is optionally chilled to a low temperature for subsequent adiabatic polymerization, and then through a centrifugal pump (3) to the polymerization reactor(s) (8). The polymerization reactor(s) (8) may be two continuous stirred tank reactors (8) which are operated in series or parallel (for simplicity, only one reactor is depicted in FIG. 1). Activator and metallocene catalyst may be premixed and added at (5) and/or (7) to one or both reactors (8). A scavenger may be added at (4) to minimize the impact of catalyst poisons in the feed and in the reactor on the catalyst activity.

Preferably, the polymerization process uses a non-polar solvent which does not coordinate with or interfere in any meaningful way so as to inhibit the catalytic action of the catalyst system. Preferably, the process uses a low boiling, alkane based solvent, optionally mixtures of alkanes, which may be linear or branched, such as those having from 4 to 10 carbon atoms, or from 5 to 7 carbon atoms, optionally in admixture with other alkanes of a higher or lower molecular weight. In preferred embodiments, the solvent comprises or is hexane, or is a mixture of hexane isomers, or is isohexane.

The propylene-based polymers described herein are prepared using one or more catalyst systems. Preferably the catalyst systems comprise a metallocene compound. In some embodiments, the metallocene compound is a bridged bisindenyl metallocene having the general formula $(In^1)Y(In^2)MX_2$, where $In^1$ and $In^2$ are the same or different, and are substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds include, but are not limited to, μ-dimethyl-silylbis(indenyl)hafniumdimethyl, μ-dimethylsilylbis(indenyl)zirconiumdimethyl, (μ-dimethyl-silyl)bis(2-methyl-4-(3',5'-di-tert-butylphenyl)indenyl)zirconiumdimethyl, dimethyl-silyl(2-methyl-4-(3',5'-di-tert-butylphenyl)indenyl)hafniumdimethyl, dimethyl-silyl)bis(2-methyl-4-naphthylindenyl)zirconiumdimethyl, methylsilyl(2-methyl-4-naphthylindenyl)hafniumdimethyl, (μ-dimethylsilyl)bis(2-methyl-4-(N-carbazyl)indenyl)-zirconiumdimethyl, and (μ-dimethylsilyl)bis(2-methyl-4-(N-carbazyl)indenyl)-hafniumdimethyl. Alternatively, the metallocene compound may correspond to one or more of the formulas disclosed in U.S. Pat. No. 7,601,666.

The activators of the catalyst systems used to produce propylene-based polymers may comprise a cationic component. In some embodiments, the cationic component has the formula $[R^1R^2R^3AH]^+$, where A is nitrogen, $R^1$ and $R^2$ are together a —$(CH_2)_a$— group, where a is 3, 4, 5 or 6 and form, together with the nitrogen atom, a 4-, 5-, 6-, or 7-membered non-aromatic ring to which, via adjacent ring carbon atoms, optionally, one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_aAH]^+$, where A is nitrogen, n is 2 or 3, and all R are identical and are $C_1$ to $C_3$ alkyl groups, such as, for example, trimethylammonium, trimethylanilinium, triethylammonium, dimethylanilinium, or dimethylammonium.

In one or more embodiments, the activators of the catalyst systems used to produce the propylene-based polymers comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments, the activator may be N,N-dimethylanilinium-tetra(perfluorophenyl)borate, N,N-dimethylanilinium-tetra(perfluoronaphthyl)borate, N,N-dimethylanilinium-tetrakis(perfluoro-biphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoro-naphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Further, the catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

Referring again to FIG. 1, the solution containing polymer, which emerges from the reactors (8) through a conduit (11), is first treated with a catalyst killer, such as, for example, water or methonal, added at (10) and which may be added as a molecular solution in hexane solvent to terminate the polymerization reaction. The polymer solution exiting the reactors (8) may contain 5-15 wt % of polymer. A heat exchanger (12) is arranged as part of a heat integrating arrangement and heated by a lean phase emerging from an upper layer (20) in a liquid phase separator (14), and provides an initial increase in the temperature of the polymer solution in the conduit (11). A trim heat exchanger (16), operating by using steam, hot oil or other high temperature fluid, further increases the temperature to a level suitable for liquid phase separation. The solution then passes through a let-down valve (18) where a pressure drop is created which causes the separation of the polymer solution and settlement into the lean phase (20) and a polymer rich phase (22) below it. The lean phase (20) may comprise less than 0.3 wt %, or less than 0.1 wt % of polymer, while the polymer rich phase (22) may comprise greater than 20 wt % polymer, or from 30-40 wt % polymer. The concentration of polymer in the polymer rich phase may be double to triple of that of the polymerization mixture that was fed to the separator (14).

The lean phase (20), after being cooled by the heat exchanger (12) is cooled further by a cooling device (24), passed through a surge tank (26) adapted for stripping out the hydrogen and then submitted to in-line chemical analysis at (41) to determine the concentration of monomer and comonomer in the solvent. Stripping vapor (25), such as ethylene, may be introduced to the surge tank (26). This cooled lean phase is combined with fresh feed of solvent and monomer (30) to provide the desired concentrations and then passed through a drier (32) which serves to remove any unreacted water or impurity present in the fresh feed supplied or in the recycled solvent and monomer.

The vapor exiting the surge tank (26) is routed to the reflux drum (39). Partly it is processed to recover valuable components, principally volatile monomers such as ethylene and propylene, by fractionating tower (36) and its overhead vapor compression/condensation system for recycling through conduit (43) to the inlet side of the drier (32). The part mainly comprising hydrogen and any other non-condensable may be flared at (112).

The polymer-rich phase is passed to a low-pressure separator (34) where evaporated solvent and monomer are separated from the more concentrated polymer solution emerging from the liquid phase separator (14) to form a concentrated polymer phase. That concentrated polymer phase may, for example, comprise 70 wt % to 95 wt % of polymer, with the rest being volatiles such as solvent and residual monomers.

The evaporated solvent and monomer phase is passed through conduit (35) in a vapor phase to the purification tower (36). The purification tower (36) may be operated by distillation to separate a light fraction of the highly volatile solvent and unreacted ethylene and propylene on the one hand and heavier less volatile components such as hexane and any toluene used to dissolve catalyst or activator and unreacted diene type comonomers on the other hand.

A gear pump (38) conveys the by now even more concentrated polymer to a vacuum devolatilizing extruder or mixer (40), where again a vapor phase is drawn off for purification, condensed and then pumped to a purification tower (50). As used herein the term "vacuum devolatizer" refers to a device in which the concentrated polymer phase is exposed to a vacuum whilst being agitated to expose new surface area, thereby causing further residual solvent and monomer to evaporate and be drawn off. The pressure in the vacuum devolatizer is preferably no more than 55 mmHg, or no more than 30 mmHg. The temperature in the vacuum devolatizer is preferably in the range of 150° C. to 270° C. The polymer exiting the vacuum devolatizer (40) may contain less than 1 wt %, or less than 0.3 wt %, or less than 0.1 wt % of volatiles (including water).

A heavy fraction of toluene used as catalyst solvent and any diene, such as ethylene norbornadiene (ENB) comonomer, or any high carbon number comonomer, such as octene-1, may be recovered by this purification tower (50). The diene and/or comonomer can be recycled through outlet (54). Alternative heavy comonomers, such as ENB and octene, may thereby be stored in separate storage vessels (55, 56), which facilitates rapid product transitions between different product families while still enabling recovery of the valuable unreacted comonomers.

The polymer melt emerging from (40) can then be pelletized in an underwater pelletizer, fed with water chilled at (42), washed and spun dried at (44) to form pellets suitable for bagging or baling at (46).

Addition of Stabilizer

The stabilizer may be compounded with the propylene-based polymer in the finishing process, such as in the pelletizer. However, in preferred embodiments, the stabilizer is introduced into the polymer polymerization in a solution or as a molten liquid.

For example, with reference to FIG. 1, the stabilizer may be introduced to the concentrated polymer-rich phase at a location upstream of the vacuum devolatizer (40). By adding the stabilizer to the concentrated polymer-rich phase at a location upstream of the vacuum devolatizer the stabilizer is intimately mixed into the concentrated polymer phase by the intensive mixing provided in the vacuum devolatizer without any additional mixing apparatus. Furthermore, the addition of stabilizer into the concentrated polymer-rich phase upstream of the vacuum devolatizer helps protect the polymer from oxidation during the devolatization and finishing processes.

In some embodiments, the stabilizer may be introduced into the polymer rich phase at a location between the liquid phase separator (14) and the let-down valve (18) or the low pressure separator (34) flash tank, or may be introduced directly into the low pressure separator (34), or may be introduced into the concentrated polymer phase (22) downstream of the flash tank, or is combined with the concentrated polymer phase (22) following its separation from the solvent-containing vapor phase.

In some embodiments, the polymerization plant comprises a gear pump (38) located downstream of the flash tank and upstream of the devolatizer (40) and the stabilizer addition is arranged such that the stabilizer is introduced into the concentrated polymer phase at a rate which is controlled in relation to the speed of the gear pump. For example, the stabilizer may be introduced at a rate which is directly proportional to the speed of the gear pump. Optionally, the stabilizer is introduced into the concentrated polymer phase downstream of the gear pump.

Means for introducing the stabilizer to the polymerization process may comprise a pump for pumping the stabilizer into the concentrated polymer phase at a suitable location, for example, into a conduit through which the concentrated polymer phase flows. Optionally, the stabilization addition means comprises a stabilizer storage vessel, heating means to heat the stabilizer storage vessel, and a metering pump to pump molten stabilizer from the stabilizer storage vessel into a conduit.

In some embodiments, the stabilizer may be added to the polymerization process in the form of a solution. For example, the stabilizer may be introduced to the polymerization process in solution with a hydrocarbon or non-hydrocarbon solvent. In some embodiments, the solvent comprises toluene. In other embodiments, the solvent is a hydrocarbon solvent and may comprise a mixture of hexane isomers. In some preferred embodiments, the solvent comprises isohexane. In some embodiments, the solution may contain at least 1 wt %, or at least 3 wt %, or at least 5 wt %, or at least 7 wt %, or at least 10 wt %, stabilizer.

In some embodiments, the stabilizer is introduced to the polymerization process as a molten liquid. In such embodiments, the stabilizer may comprise less than 10 wt %, less than 5 wt %, less than 1 wt % of solvent. The term "molten stabilizer" refers to a stabilizer, or a mixture of stabilizers, which has been heated to a temperature above its melting point and has, as a consequence, melted. The use of molten stabilizer, as compared to a solution of stabilizer, avoids the addition of further solvent to the reaction effluent and thereby decreases the burden on the solvent separation system and thus, reduces the change of inadvertently introducing contaminants in the recycled solvent stream.

The stabilizer should be chosen such that its melting point is less than the operating temperature of the vacuum devolatizer. If the melting point of the stabilizer is too high, the stabilizer may crystallize within the devolatizer and not fully disperse in the polymer melt. Thus, in preferred embodiments, the stabilizer has a melting point of 250° C. or less, or 200° C. or less, or 175° C. or less, or 150° C. or less. In some embodiments, the stabilizer may have a melting point in the range of from 40° C. to 200° C., or from 50° C. to 150° C.

The stabilizer should also be chosen such that it will remain in solution in the devolatizer. That is, the stabilizer should be chosen such that it has sufficient solubility in the polymerization solvent (e.g., hexane) that it will remain in solution during the polymerization and finishing process.

In embodiments where the stabilizer is added to the polymerization process, such as described herein, the stabilizer should be chosen such that any degradation products from the stabilizer will not act as catalyst poisons. For example, if the stabilizer is added to the vacuum devolatizer, degradation products may be introduced into the recycle stream of the polymerization process. Therefore, when the stabilizer is added to the polymerization process, the stabilizer should be chosen such that any degradation products that are emitted from the stabilizer will not interact with or significantly decrease the polymerization catalyst's activity if the degradants enter the polymerization zone via the recycle stream. As such, in preferred embodiments, the degradation products from the stabilizer do not contain hydroxyl (—OH) moieties.

The stabilizer may be added in an amount sufficient to give a concentration of stabilizer in the pelletized polymer in the range of from 200 to 2000 ppm, or from 400 to 1100 ppm, or from 500 to 750 ppm, where desirable ranges may include ranges from any lower limit to any upper limit.

Compositions comprising the propylene-based polymers and the stabilizers described herein may have an improved balance of properties, such as process stability, product stability, and color stability.

Compositions comprising the propylene-based polymers and the stabilizers described herein may have improved process stability as evidenced by a MFR multi-pass test. In the MFR multi-pass test, samples of each blend formulation are introduced into a 30 mm, Werner Pfleiderer ZSK-30, 5 zone, twin screw extruder at a melt temperature of 250° F. (121° C.). Molten polymer from the extruder cooled in a trough filled with ice cooled, potable water. The cooled strands are then chopped in a pelletizer to create pellets. The pellets are then introduced into the extruder, re-melted, and re-pelletized. This process was repeated up to five times with samples collected after the first pelletization, third pelletization, and fifth pelletization. The samples were analyzed for their melt flow rate ("MFR") using ASTM D-1238 (2.16 kg weight @ 230° C.). Samples that exhibit large changes in MFR between the first and third pass, and the first and fifth pass, tend to exhibit poor process stability. Thus, to samples having smaller changes in MFR (particularly between the first and third passes) tend to have better process stability. The compositions described herein may have a change in MFR between the first and third pass of the MFR multi-pass test of less than 35%, or less than 30%, or less than 25%, or less than 20%, or less than 18%, or less than 15%, or less than 14%, or less than 13%, or less than 12%, where the change in MFR is calculated as:

$$\Delta MFR = 100 \times ((MFR_{1st} - MFR_{3rd})/MFR_{1st})$$

where the $MFR_{1st}$ is the MFR of the composition after the first pelletization step of the MFR multi-pass test and the $MFR_{3rd}$ is the MFR of the composition after the third pelletization step of the MFR multi-pass test.

Compositions comprising the propylene-based polymers and the stabilizers described herein may have improved product stability. As polymer compositions age, the material may begin to degrade and crosslink, leading to stiffening of the polymer and decreased elasticity. Therefore, in typical polymer compositions the stress at break may increase over time due to crystallization and crosslinking that occurs over time. However, compositions comprising the propylene-based polymers and the stabilizers described herein may exhibit smaller changes in the tensile properties over time.

Compositions comprising the propylene-based polymers and the stabilizers described herein may have improved color stability. For example, the compositions described herein have a yellowness index ("YI"), as measured according to ASTM E313, of less than 5, or less than 4.5, or less than 4, or less than 3.5, or less than 3, or less than 2.5, or less than 2 after five days exposure during a burnt gas exposure test performed according to AATCC-23. The compositions described herein have a YI, as measured according to ASTM E313, of less than 5, or less than 4.5, or less than 4, or less than 3.5, or less than 3 after seven days exposure during a burnt gas exposure test performed according to AATCC-23.

The human eye can detect changes in a composition's yellowness, when the compositions yellowness index ("YI") changes by 2 or more units. Thus, compositions that have large changes in the YI over time appear yellow to the end-user. Compositions comprising the propylene-based polymers and the stabilizers described exhibit reduced changes in the YI over time. Thus, the compositions described herein may have a change in the YI ("ΔYI") between day 0 and day 5 of a burnt gas exposure test performed according to AATCC-23 of less than 5, or less than 4, or less than 3, or less than 2, or less than 1.5, where the YI is measured according to ASTM E313, and where the change in YI is calculated as:

$$\Delta YI = YI_{Day\ 5} - YI_{Day\ 0}$$

where $YI_{Day\ 5}$ is the YI of the sample after five cycles of the burnt gas exposure test and $YI_{Day\ 0}$ at the beginning of the burnt gas exposure test. Furthermore, the compositions described herein may have a change in the YI ("ΔYI") between day 0 and day 7 of a burnt gas exposure test performed according to AATCC-23 of less than 5, or less than 4, or less than 3, or less than 2, or less than 1.5 where the YI is measured according to ASTM E313, and where the change in YI is calculated as:

$$\Delta YI = YI_{Day\ 7} - YI_{Day\ 0}$$

where $YI_{Day\ 7}$ is the YI of the sample after seven cycles of the burnt gas exposure test and $YI_{Day\ 0}$ at the beginning of the burnt gas exposure test.

The color stability and color of a composition can also be evaluated using L*, a*, b*, C*, h*, and ΔE as measured and calculated according to ASTM E1347. In the L*a*b* system the color space can be visualized as a three dimensional space, where every color can be uniquely located using the L*, a*, and b* color coordinates, where L* is an indication of the lightness coordinate, where a* is an indication of the red/green coordinate, and b* is an indication of the yellow/blue coordinate. Thus, a positive a* value indicates a composition's redness and a negative a* value indicates greenness. Similarly, a positive b* indicates yellowness and a negative b* indicates blueness. A compositions color can also be described using the L*, C*, and h* coordinates. In the L*C*h* system, L* is the same as in the L*a*b* system where the L* is an indication of the lightness coordinate. The C* and h* values are computed from the a* and b* values. C* is an indication of the chroma coordinate, that is the distance from the lightness index. h* is an indication of the hue angle, which is expressed in degrees with 0° being a location of the +a* axis, then continuing to 90° for the +b* axis, 180° for the −a* axis, 270° for −b* axis, and back to 360° which is the same as 0°. The distance between the color locations can be expressed as delta E ("ΔE"), where ΔE= $(\Delta L*2 + \Delta a*2 + \Delta b*2)^{1/2}$.

The compositions described herein may exhibit smaller changes in a* over time as compared to compositions comprising different stabilizers. For example, the compositions comprising the propylene-based polymer and stabilizers described herein may have a change in the a* ("Δa*") between day 0 and day 7 of a burnt gas exposure test performed according to AATCC-23 of less than 0.5, or less than 0.4, or less than 0.3, or less than 0.2, or less than 0.1, where the a* is measured according to ASTM E1347.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The propylene-based polymers used in the Examples were metallocene-catalyzed reactor blended propylene-based elastomers ("PBE"). The PBEs were dual reactor polymers having a first reactor component (R1) and a second reactor component (R2) made in parallel solution polymerization reactors, as described with reference to FIG. 1, with the reaction effluent from each reactor being blended together to give the final reactor blended PBE. The minor fraction of the PBE had a higher crystallinity (and lower ethylene content) relative to the major fraction which had a higher ethylene content. The major fraction imparted elastic properties to the PBE while the minor fraction helped provide stability for pelletization.

In the Examples, two PBEs were used, as described in Table A below. PBE-1 was a PBE made in "barefoot form", that is, it did not contain any antioxidant additives. PBE-2 was made in the same way as PBE-1, except that Irganox™ 1076 was added to the polymerization process, as described with reference to FIG. 1, to give PBE-2 a final antioxidant loading of 500-1500 ppm antioxidant.

TABLE A

PBE Properties

| PBE | Overall C2, wt % | MFR ($I_2$ at 230° C.) g/10 min | Tm (° C.) | Hf (J/g) | Density |
|---|---|---|---|---|---|
| PBE-1 | 15.0 | 25 | — | — | 0.861 |
| PBE-2 | 15.0 | 20 | 105 | 12 | 0.861 |

The stabilizers used in the Examples were as follows.

Irganox™ 1010 is a sterically hindered primary phenolic antioxidant (chemical name: pentaerythritol tetrakis(3-(3,5-di-tert-butyl-4-hydroxyphenyl)propionate (CAS No. 6683-19-8)) that is commercially available from BASF. Irganox™ 1010 has a melting point in the range of 110-125° C., a flash point at 297° C., a density at 20° C. of 1.15 g/cm$^3$, a solubility in water at 20° C. of less than 0.0001 g/l, and a solubility in n-hexane at 20° C. of 0.3 g/100 g solution.

Irganox™ 1076 is a sterically hindered primary phenolic antioxidant that is commercially available from BASF. Irganox™ 1076 contains 80-100 wt % of benzenepropanoic acid, 3,5-bis(1,1-dimethylethyl)-4-hydroxy-octadecyl ester (CAS No. 2082-79-3). Irganox™ 1076 has a melting point in the range of 50-55° C., a flash point at 273° C., a density at 25° C. of 1.02 g/cm3, is practically insoluble in water, and has a solubility at 20° C. of 32% w/w in n-hexane.

Good-rite™ 3114 is a phenolic antioxidant that is commercially available from Emerald Performance Materials. Good-rite™ 3114 contains 60-100 wt % of 1,3,5-tris(3,5-di-tert-4-hydroxybenzyl) isocyanurate (CAS No. 27676-62-6)). Good-rite™ 3114 has a melting point of 219.5-225.5° C., a flash point at 289° C., and a solubility in water at 20° C. of less than 1 ppm.

Irgastab™ FS 042 is a stabilizer (chemical name: amines, bis(hydrogenated tallow alkyl), oxidized) (CAS Number: 143925-92-2) that is commercially available from BASF. Irgastab™ FS 042 has a melting point of 56-92° C., a boiling point of greater than 280° C., and has a solubility in water at 20° C. of less than 0.5 mg/l.

Irgastab™ FS 301 is a 50/50 blend of tris(2,4,-di-tert-butylphenyl) phosphite (CAS Number: 31570-04-4) and bis(hydrogenated tallow alkyl)amines, oxidized (CAS Number: 143925-92-2) that is commercially available from BASF. Irgastab™ FS 301 has a melting point greater than 90° C.

Genox™ EP is a blend of bis(hydrogenate rape-oil alkyl) methyl and N-oxide amines (CAS No. 204933-93-7). Genox™ EP has a melting point of about 97° C. and has a solubility of about 0.5 g/100 g toluene at 25° C. Genox™ EP is commercially available from Addivant.

Concentrates of the different stabilizers and PBE-1 were made. The concentrates were then used to produce blends of concentrate and PBE-1 by adding the concentrates (blends of stabilizer and PBE-1) in different levels to PBE-1 to achieve the final loading level of stabilizer for each sample according to the formulations in Table 1. The additive levels in Table 1 are listed using the units of parts of stabilizer per million parts of PBE-1 (ppm). In the Examples, Control Sample 2 was pure PBE-1 and did not contain any stabilizer. In the Examples, Control Sample 1 was PBE-2 and did not contain any additional antioxidant other than that which was introduced during the polymerization process as described above.

TABLE 1

Blend Formulations

| Sample # | Irganox™ 1076 | Irganox™ 1010 | Irgastab™ FS 301 | Good-rite™ 3114 | Irgastab™ FS 042 | Genox™ EP |
|---|---|---|---|---|---|---|
| Blend 3 | 500 | 0 | 0 | 0 | 0 | 0 |
| Blend 4 | 1000 | 0 | 0 | 0 | 0 | 0 |
| Blend 5 | 0 | 500 | 0 | 0 | 0 | 0 |
| Blend 6 | 0 | 1000 | 0 | 0 | 0 | 0 |
| Blend 7 | 0 | 0 | 500 | 0 | 0 | 0 |
| Blend 8 | 0 | 0 | 0 | 1000 | 0 | 0 |
| Blend 9 | 0 | 0 | 0 | 500 | 0 | 0 |
| Blend 10 | 0 | 0 | 1000 | 0 | 0 | 0 |
| Blend 11 | 0 | 0 | 0 | 0 | 0 | 500 |
| Blend 12 | 250 | 0 | 0 | 0 | 750 | 0 |
| Blend 13 | 500 | 0 | 0 | 0 | 500 | 0 |
| Blend 14 | 0 | 0 | 0 | 0 | 0 | 1000 |
| Blend 15 | 0 | 0 | 0 | 0 | 1000 | 0 |
| Blend 16 | 0 | 0 | 0 | 0 | 500 | 0 |
| Blend 17 | 500 | 0 | 0 | 0 | 0 | 500 |
| Blend 18 | 250 | 0 | 0 | 0 | 0 | 750 |
| Blend 19 | 750 | 0 | 0 | 0 | 0 | 250 |
| Blend 20 | 250 | 0 | 0 | 0 | 0 | 1000 |

Tests were performed to measure the color stability, process stability, and product stability of each blend formulation.

To evaluate the process stability of each blend formulation an MFR multi-pass test was performed. In this test dry, samples of each blend formulation were introduced into a 30 mm, Werner Pfleiderer ZSK-30, 5 zone, twin screw extruder at a melt temperature of 250° F. (121° C.). Molten polymer was then cooled in trough filled with ice cooled, potable water. Cooled strands were then chopped in a pelletizer to create pellets. The pellets were to then re-introduced into the extruder, re-melted, and re-pelletized. This process was repeated up to five times with samples collected after the first pelletization, third pelletization, and fifth pelletization. The samples were analyzed for their melt flow rate ("MFR") using ASTM D-1238 (2.16 kg weight @ 230° C.).

Figure 2:
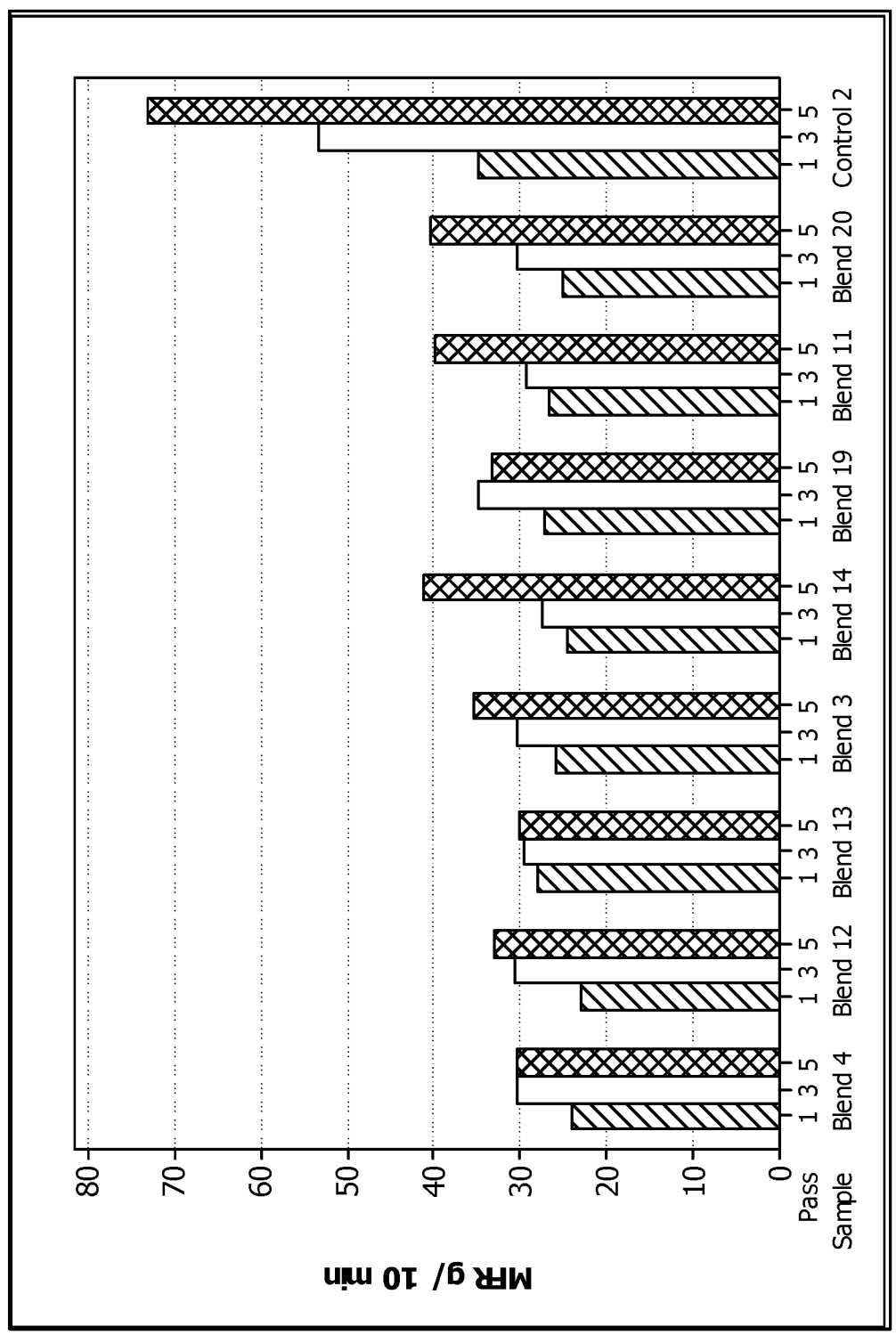
FIG. 2 shows the change in melt flow rate, for sample, formulations in the Examples during a multi-pass test.

The results of the MFR multi-pass test are shown in Table 2 and in FIG. 2.

TABLE 2

MFR Multi-Pass Test

| Sample # | MFR (g/10 min) after Pass 1 | MFR (g/10 min) after Pass 3 | MFR (g/10 min) after Pass 5 | ΔMFR (%) from Pass 1 to Pass 3 |
|---|---|---|---|---|
| Control 1 | 22.286 | 26.324 | 24.841 | 18.12 |
| Control 2 | 34.861 | 53.348 | 72.933 | 53.03 |
| Blend 3 | 25.930 | 30.339 | 35.389 | 17.00 |
| Blend 4 | 23.932 | 30.224 | 30.210 | 26.29 |
| Blend 11 | 26.502 | 29.247 | 39.709 | 10.36 |
| Blend 14 | 24.625 | 27.365 | 41.030 | 11.13 |
| Blend 15 | 23.910 | 25.494 | 27.786 | 6.62 |
| Blend 16 | 23.451 | 27.591 | 41.319 | 17.65 |
| Blend 17 | 27.859 | 29.411 | 30.141 | 5.57 |
| Blend 18 | 22.977 | 30.451 | 32.988 | 32.53 |
| Blend 19 | 27.083 | 34.801 | 33.276 | 28.50 |
| Blend 20 | 24.922 | 30.416 | 40.272 | 22.04 |

As seen in FIG. 2 and Table 2, the formulation without any stabilizer (Control Sample 2) exhibited significant degradation in the multi-pass experiment. The large change in the Control Sample 2's MFR between the first and third passes indicates that the sample experienced significant molecular weight breakdown as it was processed and, thus, possessed poor process stability. In contrast, the samples which contained stabilizer exhibited smaller changes in MFR between the first and third passes.

To evaluate the product stability and mechanical properties of the samples, nonwoven fabrics were produced by meltblowing fabrics using the blend formulations on a PET spunbond scrim. The meltblown layer containing the sample blend formulation was then separated from the scrim for testing. Tensile tests were performed on the samples of the meltblown layers using a test speed of 20 inches/min, with sample dimensions of 6 inches long, 2 inches wide, and with a 4 inch gauge length and 3 inch wide grips on the tensile tester. The fabric sample's tensile properties were measured at zero (0) weeks of aging with the results in Tables 3A and 3B and at two (2) weeks of aging with the results in Tables 4A and 4B.

TABLE 3A

Fabric Tensile Properties At 0 Weeks of Aging

| Sample # | Specimen # | Basis Weight (gsm) | Stress At Break (psi) | Strain at Break (%) | Man Ext (in) | Max Tensile Strain (%) | Total Energy (J) | 100% Mod (psi) | 200% Mod (psi) | 300% Mod (psi) |
|---|---|---|---|---|---|---|---|---|---|---|
| 1 | A | 71.1 | 204 | 676 | 30 | 750.9 | 1.8 | 64.9 | 81.3 | 99 |
| 1 | B | 70.2 | 228 | 687 | 30.1 | 752.8 | 1.9 | 72 | 91.1 | 110.8 |
| 1 | C | 72.2 | 174 | 713 | 29.6 | 740.3 | 1.7 | 63.8 | 80.6 | 99 |
| 2 | A | 70.9 | — | — | 30 | 751 | 1.4 | 47.9 | 60.5 | 72.1 |
| 2 | B | 66.6 | 157 | 745 | 30 | 751 | 1.5 | 54.8 | 68.4 | 81.8 |
| 2 | C | 64.9 | — | — | 30.1 | 752.9 | 1.5 | 53.6 | 67.1 | 80.3 |
| 3 | A | 75.5 | 180 | 668 | 26.8 | 669.3 | 1.4 | 59.6 | 75.8 | 91.4 |
| 3 | B | 73.3 | 173 | 638 | 25.6 | 639.7 | 1.3 | 61.8 | 78.3 | 94.8 |
| 3 | C | 75.1 | 171 | 642 | 26 | 650.6 | 1.3 | 59.8 | 76.2 | 93.9 |
| 4 | A | 79.3 | 190 | 596 | 23.9 | 598.1 | 1.4 | 70 | 88.5 | 107.6 |
| 4 | B | 70.8 | 194 | 718 | 30 | 750.5 | 1.9 | 71.5 | 90 | 109.3 |
| 4 | C | 76.9 | 213 | 721 | 29.3 | 731.4 | 2.1 | 77.4 | 97.2 | 117.6 |
| 5 | A | 75.7 | 138 | 588 | 23.6 | 589.2 | 1 | 53.3 | 66.9 | 81.7 |
| 5 | B | 76.6 | 140 | 709 | 28.4 | 710.7 | 1.5 | 61.3 | 77 | 92.8 |
| 5 | C | 77.4 | 160 | 667 | 26.7 | 668.4 | 1.2 | 53.8 | 67.3 | 82 |
| 6 | A | 72.4 | 185 | 720 | 30.1 | 752.1 | 1.7 | 61.3 | 76 | 92.1 |
| 6 | B | 69.7 | 229 | 712 | 29.6 | 741 | 1.9 | 67.5 | 84.1 | 102 |
| 6 | C | 72.3 | — | — | 30.1 | 752.3 | 2 | 68.5 | 84.9 | 101.5 |
| 7 | A | 79.3 | 176 | 560 | 22.4 | 560.4 | 1 | 64.5 | 83.8 | 104.1 |
| 7 | B | 77.2 | 230 | 631 | 26.3 | 658 | 1.4 | 73.8 | 94.2 | 117 |
| 7 | C | 75.9 | 178 | 582 | 23.3 | 582.2 | 1 | 61.7 | 80.5 | 99.9 |
| 8 | A | 76.8 | 230 | 735 | 30.1 | 751.7 | 2 | 84.1 | 106.3 | 130.2 |
| 8 | B | 81.6 | 240 | 729 | 29.9 | 748.6 | 1.9 | 80.3 | 100.9 | 123.3 |
| 8 | C | 82.8 | 229 | 702 | 30.1 | 751.9 | 1.8 | 77.7 | 97.9 | 118.7 |
| 9 | A | 74.9 | 248 | 705 | 30 | 750.4 | 1.7 | 75 | 93.3 | 112.9 |
| 9 | B | 75.8 | 266 | 716 | 30 | 750.7 | 1.8 | 80.6 | 99.6 | 119.6 |
| 9 | C | 78.0 | 245 | 704 | 28.2 | 705.1 | 1.6 | 73.1 | 91.7 | 110.2 |
| 10 | A | 72.7 | 164 | 534 | 21.4 | 535 | 0.9 | 65.2 | 84.3 | 103.8 |
| 10 | B | 72.5 | 141 | 510 | 23.3 | 582.5 | 0.8 | 58 | 75.4 | 93 |
| 10 | C | 67.0 | 159 | 539 | 21.6 | 540.6 | 0.9 | 61.2 | 79.3 | 97.9 |

TABLE 3B

Fabric Tensile Properties At 0 Weeks of Aging

| Sample # | Specimen # | Basis Weight (gsm) | Stress At Break (psi) | Strain at Break (%) | Man Ext (in) | Max Tensile Strain (%) | Total Energy (J) | 100% Mod (psi) | 200% Mod (psi) | 300% Mod (psi) |
|---|---|---|---|---|---|---|---|---|---|---|
| 11 | A | 67.0 | 126 | 553 | 22.6 | 565 | 0.7 | 48.9 | 63.4 | 78.1 |
| 11 | B | 62.5 | 150 | 568 | 23.3 | 581.9 | 0.9 | 56.9 | 73.4 | 90.4 |
| 11 | C | 64.5 | 172 | 597 | 23.9 | 597.2 | 1 | 62.2 | 79.1 | 97.2 |
| 12 | A | 65.5 | 161 | 544 | 21.8 | 544.8 | 0.9 | 62.8 | 80.4 | 99 |
| 12 | B | 68.5 | 131 | 474 | 19.4 | 484 | 0.6 | 56 | 72.7 | 90.6 |
| 12 | C | 69.7 | 163 | 574 | 23 | 574.6 | 0.9 | 56.8 | 73.7 | 91.3 |
| 13 | A | 67.8 | 167 | 564 | 22.6 | 564.4 | 1 | 62.1 | 80.3 | 99.3 |
| 13 | B | 68.3 | 160 | 559 | 22.4 | 559.6 | 0.9 | 61.1 | 78.2 | 96.1 |
| 13 | C | 68.6 | 125 | 536 | 21.9 | 547.1 | 0.7 | 48 | 62.4 | 78.3 |
| 13 | D | — | 143 | 558 | 22.8 | 570.7 | 0.8 | 54 | 70 | 86.5 |
| 14 | A | 69.5 | 186 | 547 | 21.9 | 547 | 1 | 73 | 93.9 | 114.2 |
| 14 | B | 70.7 | 165 | 561 | 22.5 | 562.5 | 0.9 | 59.6 | 77.8 | 95.8 |
| 14 | C | 70.5 | 194 | 582 | 23.3 | 583.5 | 1.1 | 66.8 | 86.5 | 107.3 |
| 15 | A | 68.6 | 117 | 597 | 23.9 | 597.8 | 1 | 62.5 | 80.6 | 100 |
| 15 | B | 66.6 | 161 | 555 | 22.2 | 555.5 | 0.9 | 60 | 77.6 | 95.7 |
| 15 | C | 64.0 | 171 | 557 | 22.3 | 558.5 | 1 | 65.2 | 84.4 | 104.5 |
| 16 | A | 68.8 | 207 | 603 | 24.2 | 604.7 | 1.3 | 73.7 | 93.6 | 115.4 |
| 16 | B | 66.5 | 182 | 595 | 23.9 | 596.3 | 1.1 | 65.4 | 84.2 | 103.7 |
| 16 | C | 70.5 | 136 | 547 | 22.2 | 555.7 | 0.8 | 52.1 | 67.8 | 84.5 |
| 17 | A | 66.3 | 151 | 581 | 23.6 | 590.9 | 0.9 | 55.9 | 72 | 88.3 |
| 17 | B | 64.3 | 121 | 518 | 21.2 | 529.9 | 0.7 | 49.7 | 64.7 | 79.8 |
| 17 | C | 65.3 | 178 | 597 | 23.9 | 596.9 | 1.1 | 65.5 | 83.7 | 104.3 |
| 17 | D | — | 185 | 627 | 25.1 | 627.5 | 1.1 | 60.5 | 77.9 | 95.3 |
| 18 | A | 66.7 | 190 | 659 | 26.4 | 659.6 | 1.2 | 60.7 | 78 | 95.4 |
| 18 | B | 65.6 | 172 | 555 | 22.2 | 555.7 | 1 | 66.1 | 85.5 | 106.1 |
| 18 | C | 69.9 | 131 | 507 | 22.1 | 552.3 | 0.7 | 54.1 | 69.6 | 86 |
| 18 | D | — | 142 | 569 | 27.3 | 683.5 | 0.8 | 52.4 | 68 | 84.1 |
| 19 | A | 70.8 | 219 | 698 | 27.9 | 698.7 | 1.4 | 68.4 | 85.9 | 103.8 |
| 19 | B | 68.0 | 204 | 644 | 25.9 | 647.1 | 1.3 | 70.5 | 88.2 | 107.4 |
| 19 | C | 68.0 | 131 | 657 | 26.3 | 658.2 | 1.1 | 60.9 | 77.2 | 93.9 |
| 19 | D | — | 144 | 610 | 24.9 | 623.4 | 0.9 | 52.7 | 67.4 | 81.9 |
| 20 | A | 63.2 | 158 | 551 | 22.1 | 551.7 | 0.9 | 60.5 | 77.5 | 95.8 |
| 20 | B | 67.0 | 133 | 483 | 19.8 | 494 | 0.7 | 60.2 | 77.8 | 95.7 |
| 20 | C | 66.4 | 146 | 528 | 24 | 600.9 | 0.9 | 63.8 | 81.3 | 99.6 |
| 20 | D | — | 136 | 537 | 21.9 | 546.4 | 0.8 | 55.7 | 71.9 | 87.3 |

TABLE 4A

Fabric Tensile Properties At 2 Weeks of Aging

| Sample # | Specimen # | Basis Weight (gsm) | Stress At Break (psi) | Strain at Break (%) | Man Ext (in) | Max Tensile Strain (%) | Total Energy (J) | 100% Mod (psi) | 200% Mod (psi) | 300% Mod (psi) |
|---|---|---|---|---|---|---|---|---|---|---|
| 1 | A | 71.1 | 233 | 718 | 29.4 | 736.1 | 1.9 | 86.1 | 110.3 | 137.5 |
| 1 | B | 70.2 | 231 | 712 | 29.5 | 738 | 1.9 | 88.2 | 113.3 | 140.3 |
| 1 | C | 72.2 | 284 | 728 | 29.1 | 727.7 | 1.9 | 83.9 | 109 | 135.5 |
| 2 | A | 70.9 | — | — | 30.1 | 751.9 | 1.7 | 96.6 | 121.5 | 147.3 |
| 2 | B | 66.6 | — | — | 30.1 | 752.5 | 1.6 | 94.9 | 120.7 | 147.2 |
| 2 | C | 64.9 | — | — | 30 | 750.5 | 1.5 | 95.6 | 119.2 | 144.4 |
| 3 | A | 75.5 | 272 | 679 | 27.2 | 679.9 | 1.3 | 84.7 | 109.8 | 135.7 |
| 3 | B | 73.3 | 294 | 734 | 29.4 | 734.5 | 1.8 | 84 | 107.3 | 130.9 |
| 3 | C | 75.1 | 179 | 685 | 27.4 | 685.7 | 1.6 | 87.4 | 112.1 | 138.6 |
| 4 | A | 79.3 | 301 | 749 | 30.1 | 752.2 | 2 | 96.1 | 123 | 149.9 |
| 4 | B | 70.8 | 255 | 760 | 31.3 | 782 | 1.9 | 94.5 | 120.7 | 148 |
| 4 | C | 76.9 | 190 | 693 | 29 | 724.5 | 1.5 | 95.2 | 121.1 | 148.1 |
| 5 | A | 75.7 | 254 | 671 | 27.3 | 682.3 | 1.7 | 97.9 | 125.4 | 154.5 |
| 5 | B | 76.6 | 387 | 763 | 31.1 | 777.3 | 2.2 | 116.9 | 148.3 | 181.2 |
| 5 | C | 77.4 | 348 | 705 | 28.9 | 723.7 | 1.7 | 106.4 | 136.3 | 168.2 |
| 6 | A | 72.4 | 388 | 725 | 29.9 | 747.6 | 2 | 113.7 | 145 | 178.4 |
| 6 | B | 69.7 | 359 | 729 | 30.3 | 757.9 | 2.1 | 103.7 | 132.7 | 163 |
| 6 | C | 72.3 | 295 | 743 | 30.5 | 761.5 | 1.7 | 91.2 | 117.1 | 145.5 |
| 7 | A | 79.3 | 354 | 748 | 29.9 | 748.5 | 2 | 98.3 | 125.1 | 153.5 |
| 7 | B | 77.2 | 320 | 681 | 27.3 | 681.6 | 1.5 | 92.7 | 121.3 | 151.4 |
| 7 | C | 75.9 | 291 | 700 | 28 | 700.5 | 1.8 | 82.4 | 107.3 | 134.5 |
| 8 | A | 76.8 | 273 | 613 | 25.3 | 632.3 | 1.4 | 91.3 | 120.2 | 150.1 |
| 8 | B | 81.6 | 200 | 571 | 22.8 | 571 | 0.9 | 70.3 | 93.9 | 118.4 |
| 8 | C | 82.8 | 200 | 681 | 27.7 | 692.6 | 1.6 | 90 | 115 | 141.6 |
| 9 | A | 74.9 | 234 | 670 | 28.8 | 720.6 | 1.7 | 96.1 | 124.3 | 155.5 |

TABLE 4A-continued

Fabric Tensile Properties At 2 Weeks of Aging

| Sample # | Specimen # | Basis Weight (gsm) | Stress At Break (psi) | Strain at Break (%) | Man Ext (in) | Max Tensile Strain (%) | Total Energy (J) | 100% Mod (psi) | 200% Mod (psi) | 300% Mod (psi) |
|---|---|---|---|---|---|---|---|---|---|---|
| 9  | B | 75.8 | 223 | 675 | 27   | 676   | 1.6 | 95.6 | 123.5 | 153.1 |
| 9  | C | 78.0 | 323 | 726 | 29.2 | 729.2 | 1.8 | 91.8 | 117.3 | 143.6 |
| 10 | A | 72.7 | 275 | 743 | 30.4 | 760.4 | 1.9 | 90.3 | 116.1 | 144.1 |
| 10 | B | 72.5 | 340 | 743 | 29.9 | 747.3 | 2   | 92.1 | 118.4 | 145.8 |
| 10 | C | 67.0 | 158 | 450 | 18   | 450.7 | 0.6 | 70.2 |  93.5 | 117.7 |

TABLE 4B

Fabric Tensile Properties At 2 Weeks of Aging

| Sample # | Specimen # | Basis Weight (gsm) | Stress At Break (psi) | Strain at Break (%) | Man Ext (in) | Max Tensile Strain (%) | Total Energy (J) | 100% Mod (psi) | 200% Mod (psi) | 300% Mod (psi) |
|---|---|---|---|---|---|---|---|---|---|---|
| 11 | A | 67.0 | 206 | 529 | 21.2 | 529.7 | 0.9 | 77.3 | 102.5 | 128.3 |
| 11 | B | 62.5 | 192 | 467 | 18.7 | 467   | 0.8 | 84.9 | 112   | 139   |
| 11 | C | 64.5 | 160 | 502 | 20.1 | 503.1 | 0.7 | 62.7 |  84.5 | 105.9 |
| 12 | A | 65.5 | 156 | 596 | 23.9 | 596.5 | 1   | 91.7 | 120.7 | 150.1 |
| 12 | B | 68.5 | 190 | 571 | 22.9 | 571.5 | 0.9 | 67.7 |  90.5 | 113.9 |
| 12 | C | 69.7 | 146 | 510 | 20.5 | 511.3 | 0.7 | 58.9 |  78.9 |  98.1 |
| 13 | A | 67.8 | 237 | 653 | 26.2 | 654.1 | 1.3 | 73.6 |  96.9 | 120.7 |
| 13 | B | 68.3 | 177 | 555 | 23   | 575.7 | 0.8 | 64   |  85.3 | 107.8 |
| 13 | C | 68.6 | 230 | 582 | 23.3 | 582.2 | 1.1 | 79.3 | 104.6 | 131.1 |
| 13 | D | —    | 243 | 535 | 21.4 | 535.7 | 0.9 | 90.8 | 120.1 | 150.8 |
| 14 | A | 69.5 | 199 | 533 | 21.4 | 534   | 0.9 | 77.6 | 102.1 | 128.1 |
| 14 | B | 70.7 | 255 | 642 | 25.7 | 643.7 | 1.2 | 81.7 | 107   | 132   |
| 14 | C | 70.5 | 246 | 602 | 24.1 | 603   | 1.1 | 81.8 | 107.7 | 135.4 |
| 15 | A | 68.6 | 171 | 515 | 21.2 | 528.9 | 0.7 | 66.6 |  88.8 | 111.8 |
| 15 | B | 66.6 | 216 | 603 | 24.2 | 604.1 | 1.1 | 74   |  97.2 | 120.2 |
| 15 | C | 64.0 | 183 | 530 | 21.9 | 547   | 0.8 | 70.6 |  93.6 | 116.8 |
| 16 | A | 68.8 | 193 | 601 | 24.1 | 601.3 | 1   | 64.6 |  85.7 | 108.5 |
| 16 | B | 66.5 | 204 | 612 | 24.5 | 612.5 | 1.2 | 70.8 |  94.2 | 117.7 |
| 16 | C | 70.5 | 181 | 568 | 22.8 | 569   | 1   | 65.2 |  86.7 | 108.1 |
| 17 | A | 66.3 | 128 | 430 | 17.7 | 443.6 | 0.5 | 58.8 |  78.2 |  97.7 |
| 17 | B | 64.3 | 219 | 560 | 22.4 | 561.2 | 1   | 81.4 | 108.9 | 134.9 |
| 17 | C | 65.3 | 187 | 543 | 21.8 | 544   | 0.9 | 72.1 |  95   | 117.6 |
| 17 | D | —    | 165 | 531 | 21.7 | 542.6 | 0.8 | 64.6 |  86.5 | 109.5 |
| 18 | A | 66.7 | 219 | 596 | 23.9 | 596.6 | 1   | 75   |  99.1 | 124.1 |
| 18 | B | 65.6 | 253 | 653 | 26.1 | 653.3 | 1.2 | 78.1 | 103   | 129.1 |
| 18 | C | 69.9 | 210 | 589 | 23.6 | 590.2 | 1.1 | 73.6 |  96.9 | 120.9 |
| 18 | D | —    | 219 | 539 | 21.6 | 541   | 0.9 | 84.4 | 109.9 | 136.3 |
| 19 | A | 70.8 | 238 | 595 | 23.8 | 595.9 | 1.1 | 82.8 | 109.3 | 135.8 |
| 19 | B | 68.0 | 164 | 520 | 21.4 | 536.1 | 0.7 | 65.2 |  87.4 | 108.9 |
| 19 | C | 68.0 | 182 | 527 | 21.5 | 536.4 | 0.7 | 71   |  93.8 | 116.6 |
| 19 | D | —    | 219 | 560 | 22.4 | 560.5 | 0.9 | 84   | 110.1 | 135.8 |
| 20 | A | 63.2 | 116 | 543 | 22.4 | 561   | 0.8 | 78.6 | 104.3 | 128.6 |
| 20 | B | 67.0 | 223 | 621 | 24.8 | 621.2 | 1   | 74.4 |  98.1 | 123.1 |
| 20 | C | 66.4 | 212 | 558 | 22.7 | 568.5 | 0.9 | 78.4 | 103.4 | 129.1 |
| 20 | D | —    | 251 | 682 | 27.3 | 682.6 | 1.3 | 77.1 | 100.1 | 123.2 |

Figure 3:
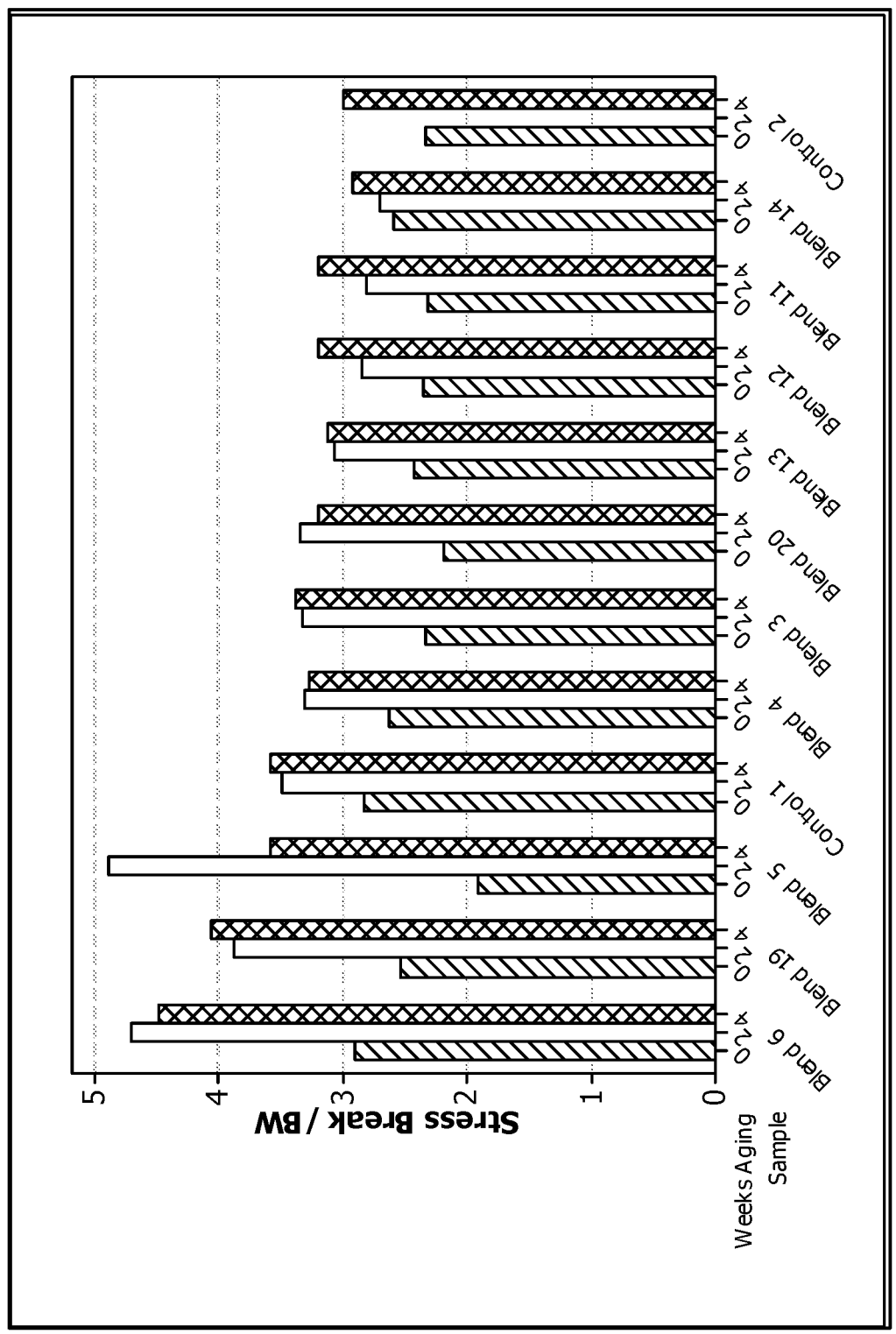
FIG. 3 shows the change in the stress break over time for sample formulations in the Examples.

The tensile stress properties of the fabrics provide an indication of resin degradation, as more stable blends will exhibit a higher stress at break and more stable blends will tend to exhibit smaller changes in the stress over time. The data in Tables 3 and 4 represent the raw data as measured on the fabric samples. In FIG. 3, the stress at break was normalized for the basis weight of the fabric. Thus, as illustrated in FIG. 3, fabrics made from Blends 11 and 14 exhibited smaller changes in the stress at break from 0 to 2 weeks as compared to Blends 3, 4, 5, 6, 13, 19, and 20.

Figure 4:
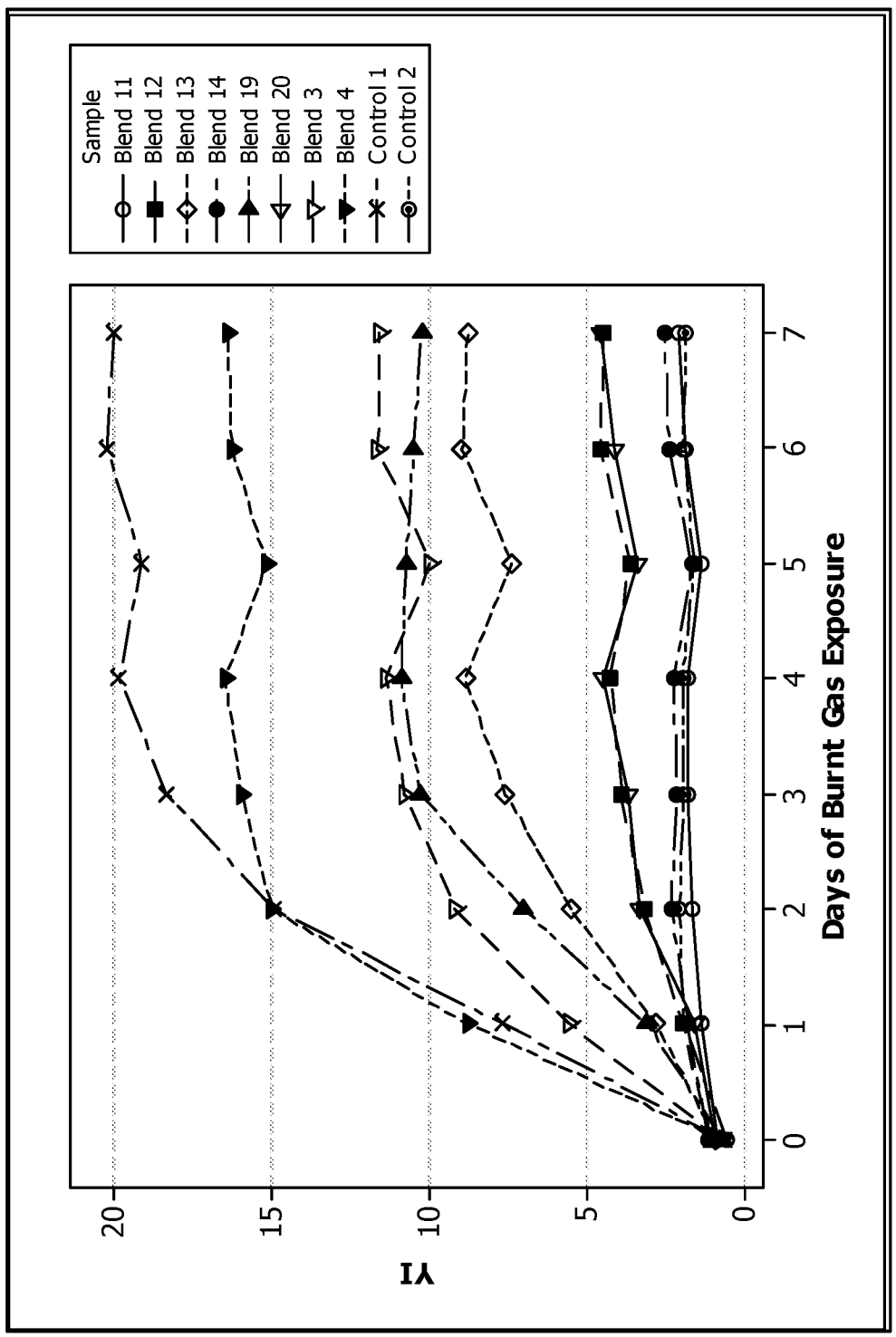
FIG. 4 shows the change in the yellowness index over time during the gas aging test in the Examples.

To evaluate the color stability, fabric samples were tested for burnt gas exposure according to AATCC-23 for multiple cycles. Each cycle represents 24 hours of gas exposure. After each cycle, samples were tested in a Spectrophotometer for Yellowness and Whiteness Indices (ASTM E313) and Color and Color-Difference (ASTM E1347). The results of the tests are listed in Tables 5A, 5B, 5C, and 5D, and in FIG. 4.

TABLE 5A

Fabric Gas Fade Properties

| Sample | Pass | L* | a* | b* | C* | h* | delta E | YI | WI | Tint |
|---|---|---|---|---|---|---|---|---|---|---|
| Control 1 | 0 | 96.5 | 0.09 | 0.3 | 0.31 | 72.41 | 0 | 0.64 | 90.09 | −0.42 |
| Control 1 | 1 | 95.11 | −0.67 | 4.2 | 4.25 | 99.09 | 4.21 | 7.64 | 68.11 | −1.37 |
| Control 1 | 2 | 93.66 | −2.06 | 8.62 | 8.86 | 103.47 | 9.05 | 14.92 | 44 | −1.77 |
| Control 1 | 3 | 92.55 | −2.19 | 10.55 | 10.77 | 101.74 | 11.22 | 18.29 | 32.97 | −2.62 |
| Control 1 | 4 | 92.16 | −1.82 | 10.96 | 11.11 | 99.44 | 11.67 | 19.84 | 28.42 | −3.73 |
| Control 1 | 5 | 91.46 | −1.74 | 10.5 | 10.65 | 99.42 | 11.53 | 19.09 | 27.41 | −4 |
| Control 1 | 6 | 91.5 | −1.09 | 10.95 | 11.01 | 95.68 | 11.83 | 20.19 | 27.52 | −5 |
| Control 1 | 7 | 91.25 | −0.68 | 10.3 | 10.33 | 93.77 | 11.33 | 20.02 | 27.71 | −5.31 |
| Control 2 | 0 | 96.75 | −0.04 | 0.34 | 0.34 | 97 | 0 | 0.57 | 91.13 | −0.19 |
| Control 2 | 1 | 96.84 | 0.02 | 0.97 | 0.97 | 88.78 | 0.68 | 1.91 | 86.39 | −0.64 |
| Control 2 | 2 | 96.53 | −0.02 | 1.01 | 1.01 | 91.29 | 0.73 | 2.05 | 85.3 | −0.76 |
| Control 2 | 3 | 96.01 | −0.01 | 1 | 1 | 90.83 | 0.99 | 1.9 | 86.18 | −0.49 |
| Control 2 | 4 | 96.11 | −0.03 | 1.02 | 1.02 | 91.46 | 0.93 | 1.96 | 86.22 | −0.46 |
| Control 2 | 5 | 94.85 | −0.04 | 0.78 | 0.78 | 93.1 | 1.94 | 1.58 | 83.73 | −0.57 |
| Control 2 | 6 | 95.98 | −0.08 | 1.11 | 1.11 | 93.93 | 1.09 | 1.91 | 86.28 | −0.4 |
| Control 2 | 7 | 95.98 | −0.08 | 1.11 | 1.12 | 94.16 | 1.09 | 1.88 | 86.1 | −0.43 |
| Sample 3 | 0 | 96.53 | −0.02 | 0.39 | 0.4 | 93.14 | 0 | 0.75 | 89.21 | −0.26 |
| Sample 3 | 1 | 95.13 | −0.22 | 3.07 | 3.07 | 94.04 | 3.11 | 5.53 | 74.25 | −1.42 |
| Sample 3 | 2 | 94.54 | 0.82 | 5.19 | 5.26 | 99.01 | 5.35 | 9.15 | 63.67 | −1.8 |
| Sample 3 | 3 | 93.82 | −0.91 | 6.07 | 6.14 | 98.57 | 6.35 | 10.76 | 57.86 | −2.15 |
| Sample 3 | 4 | 94 | −0.98 | 6.32 | 6.4 | 98.77 | 6.51 | 11.36 | 56.1 | −2.22 |
| Sample 3 | 5 | 92.16 | −1.08 | 5.2 | 5.31 | 101.69 | 6.58 | 9.95 | 56.03 | −1.69 |
| Sample 3 | 6 | 93.94 | −0.96 | 6.48 | 6.55 | 98.4 | 6.68 | 11.62 | 56.22 | −2.39 |
| Sample 3 | 7 | 93.74 | −0.88 | 6.37 | 6.43 | 97.91 | 6.64 | 11.56 | 56.34 | −2.53 |
| Sample 4 | 0 | 96.67 | −0.05 | 0.44 | 0.45 | 95.96 | 0 | 0.74 | 89.68 | −0.23 |
| Sample 4 | 1 | 95.16 | −0.84 | 4.92 | 4.99 | 99.67 | 4.79 | 8.76 | 65.02 | −1.59 |
| Sample 4 | 2 | 93.99 | −1.79 | 8.31 | 8.5 | 102.13 | 8.49 | 14.96 | 44.71 | −2.36 |
| Sample 4 | 3 | 93.2 | −1.52 | 8.98 | 9.11 | 99.63 | 9.34 | 15.93 | 41.68 | −2.94 |
| Sample 4 | 4 | 92.94 | −1.3 | 9.16 | 9.25 | 98.1 | 9.56 | 16.45 | 40.37 | −3.33 |
| Sample 4 | 5 | 92.27 | −1.39 | 8.41 | 8.52 | 99.37 | 9.2 | 15.15 | 40.91 | −2.92 |
| Sample 4 | 6 | 92.85 | −1.13 | 9.06 | 9.13 | 97.09 | 9.49 | 16.24 | 41.1 | −3.52 |
| Sample 4 | 7 | 92.73 | −0.95 | 8.99 | 9.04 | 96.05 | 9.45 | 16.38 | 40.83 | −3.85 |
| Sample 5 | 0 | 96.58 | −0.1 | 0.52 | 0.52 | 100.82 | 0 | 0.88 | 90.09 | −0.18 |
| Sample 5 | 1 | 95.12 | −0.58 | 3.9 | 3.94 | 98.46 | 3.72 | 7.16 | 69.19 | −1.43 |
| Sample 5 | 2 | 94.58 | −1.04 | 5.51 | 5.61 | 100.71 | 5.46 | 10 | 60.1 | −1.79 |
| Sample 5 | 3 | 94 | −1.25 | 6.68 | 6.79 | 100.61 | 6.78 | 11.78 | 55.01 | −1.8 |
| Sample 5 | 4 | 93.92 | −1.44 | 7.85 | 7.98 | 100.37 | 7.91 | 13.63 | 49.4 | −2.13 |
| Sample 5 | 5 | 91.73 | −1.54 | 7.06 | 7.22 | 102.28 | 8.27 | 12.37 | 46.16 | −1.93 |
| Sample 5 | 6 | 93.35 | −1.63 | 9.23 | 9.37 | 100 | 9.42 | 16.13 | 41.49 | −2.68 |
| Sample 5 | 7 | 93.04 | −1.68 | 9.85 | 9.99 | 99.67 | 10.11 | 17.22 | 37.79 | −2.87 |

TABLE 5B

Fabric Gas Fade Properties

| Sample | Pass | L* | a* | b* | C* | h* | delta E | YI | WI | Tint |
|---|---|---|---|---|---|---|---|---|---|---|
| Sample 6 | 0 | 96.49 | −0.12 | 0.53 | 0.55 | 102.65 | 0 | 0.98 | 89.44 | −0.18 |
| Sample 6 | 1 | 95.17 | −0.94 | 4.46 | 4.56 | 101.93 | 4.22 | 7.79 | 67.39 | −1.07 |
| Sample 6 | 2 | 94.62 | −1.52 | 6.48 | 6.65 | 103.24 | 6.39 | 11.35 | 56.5 | −1.56 |
| Sample 6 | 3 | 94.13 | −1.95 | 8.21 | 8.43 | 103.37 | 8.23 | 14.08 | 48.2 | −1.51 |
| Sample 6 | 4 | 94.02 | −2.15 | 9.59 | 9.83 | 102.62 | 9.61 | 16.33 | 40.8 | −1.9 |
| Sample 6 | 5 | 92.73 | −2.38 | 9.94 | 9.74 | 104.13 | 9.93 | 15.95 | 37.14 | −1.74 |
| Sample 6 | 6 | 93.04 | −2.84 | 11.13 | 11.48 | 104.33 | 11.47 | 19.49 | 30.55 | −2.4 |
| Sample 6 | 7 | 92.95 | −2.58 | 12.67 | 12.93 | 101.51 | 12.88 | 21.81 | 23.03 | −3.03 |
| Sample 7 | 0 | 96.45 | −0.06 | 0.4 | 0.41 | 98.06 | 0 | 0.74 | 88.82 | −0.19 |
| Sample 7 | 1 | 95.8 | 0.19 | 1.12 | 1.13 | 80.22 | 1 | 2.31 | 85.07 | −0.92 |
| Sample 7 | 2 | 94.7 | 0.37 | 2.18 | 2.21 | 80.32 | 2.53 | 4.24 | 79.01 | −2.09 |
| Sample 7 | 3 | 94.4 | 0.78 | 2.77 | 2.87 | 74.25 | 3.24 | 6 | 73.91 | −3 |
| Sample 7 | 4 | 94.17 | 0.96 | 3.43 | 3.56 | 74.38 | 3.92 | 6.7 | 72.2 | −3.52 |
| Sample 7 | 5 | 92.89 | 0.55 | 2.52 | 2.58 | 77.7 | 4.19 | 5.16 | 71.11 | −2.58 |
| Sample 7 | 6 | 94.49 | 0.51 | 3.36 | 3.4 | 81.32 | 3.59 | 6.61 | 72.25 | −2.88 |
| Sample 7 | 7 | 94.26 | 0.56 | 3.75 | 3.79 | 81.56 | 4.04 | 6.65 | 71.88 | −2.89 |
| Sample 8 | 0 | 95.74 | −0.08 | 0.32 | 0.33 | 104.92 | 0 | 0.59 | 88.42 | −0.12 |
| Sample 8 | 1 | 95.33 | −0.78 | 1.81 | 1.97 | 113.31 | 1.77 | 2.66 | 80.41 | 0.26 |
| Sample 8 | 2 | 94.314 | −1.55 | 3.05 | 3.42 | 116.91 | 3.52 | 4.74 | 71.76 | 0.68 |
| Sample 8 | 3 | 92.92 | −2.01 | 3.32 | 3.88 | 121.23 | 4.55 | 5.11 | 67.65 | 1.68 |
| Sample 8 | 4 | 92.92 | −2.68 | 5.52 | 6.13 | 115.89 | 6.46 | 7.59 | 59.31 | 2 |
| Sample 8 | 5 | 92.21 | −2.8 | 6.01 | 6.63 | 114.96 | 7.23 | 9.13 | 53.42 | 1.29 |
| Sample 8 | 6 | 92.47 | −3.13 | 7.43 | 8.06 | 112.84 | 8.39 | 11.38 | 48.04 | 1.65 |
| Sample 8 | 7 | 91.25 | −3.53 | 7.87 | 8.62 | 114.13 | 9.43 | 11.96 | 44.03 | 2.14 |
| Sample 9 | 0 | 96.42 | −0.07 | 0.36 | 0.36 | 100.71 | 0 | 0.56 | 89.7 | −0.14 |
| Sample 9 | 1 | 95.8 | −0.51 | 1.33 | 1.43 | 111.04 | 1.24 | 2 | 83.47 | 0.12 |

TABLE 5B-continued

Fabric Gas Fade Properties

| Sample | Pass | L* | a* | b* | C* | h* | delta E | YI | WI | Tint |
|---|---|---|---|---|---|---|---|---|---|---|
| Sample 9 | 2 | 94.81 | −1.07 | 2.23 | 2.48 | 115.7 | 2.73 | 3.44 | 76.48 | 0.36 |
| Sample 9 | 3 | 94.09 | −1.5 | 2.78 | 3.16 | 118.36 | 3.66 | 3.95 | 73.98 | 1.06 |
| Sample 9 | 4 | 94.09 | −1.86 | 3.89 | 4.31 | 115.54 | 4.59 | 5.73 | 68.62 | 1.28 |
| Sample 9 | 5 | 93.54 | −1.95 | 4.37 | 4.78 | 114.05 | 5.28 | 6.82 | 63.58 | 0.7 |
| Sample 9 | 6 | 94.08 | −2.29 | 5.63 | 6.08 | 112.12 | 6.18 | 8.76 | 60.25 | 1 |
| Sample 9 | 7 | 93.67 | −2.57 | 5.79 | 6.33 | 113.89 | 6.59 | 8.63 | 58.91 | 1.38 |
| Sample 10 | 0 | 96.14 | −0.13 | 0.47 | 0.49 | 105.52 | 0 | 0.84 | 88.26 | −0.13 |
| Sample 10 | 1 | 95.74 | −0.03 | 0.97 | 0.97 | 91.72 | 0.92 | 1.77 | 85.61 | −0.5 |
| Sample 10 | 2 | 95.43 | 0.13 | 2.22 | 2.23 | 86.58 | 1.91 | 4.52 | 77.46 | −1.82 |
| Sample 10 | 3 | 94.36 | 0.78 | 3.68 | 3.76 | 77.98 | 4.28 | 7.67 | 68.9 | −3.83 |
| Sample 10 | 4 | 92.88 | 1.24 | 4.73 | 4.89 | 75.29 | 5.53 | 9.78 | 63.08 | −5.1 |
| Sample 10 | 5 | 92.17 | 0.97 | 3.84 | 3.96 | 75.8 | 5.32 | 8.32 | 62.72 | −4.33 |
| Sample 10 | 6 | 93.01 | 1.17 | 4.77 | 4.91 | 76.21 | 5.47 | 10.09 | 62 | −5.21 |
| Sample 10 | 7 | 92.85 | 1.17 | 4.7 | 4.84 | 76.05 | 5.51 | 9.85 | 62.2 | −5.03 |

TABLE 5C

Fabric Gas Fade Properties

| Sample | Pass | L* | a* | b* | C* | h* | delta E | YI | WI | Tint |
|---|---|---|---|---|---|---|---|---|---|---|
| Sample 11 | 0 | 96.3 | −0.12 | 0.5 | 0.51 | 103.25 | 0 | 0.83 | 88.91 | −0.16 |
| Sample 11 | 1 | 96.41 | −0.08 | 0.76 | 0.76 | 96.06 | 0.4 | 1.37 | 87.33 | −0.3 |
| Sample 11 | 2 | 95.43 | −0.12 | 0.93 | 0.94 | 97.18 | 0.97 | 1.64 | 84.42 | −0.43 |
| Sample 11 | 3 | 95.69 | −0.09 | 0.96 | 0.96 | 95.23 | 0.76 | 1.76 | 86.2 | −0.32 |
| Sample 11 | 4 | 95.63 | −0.12 | 1 | 1 | 96.6 | 0.83 | 1.77 | 85.77 | −0.32 |
| Sample 11 | 5 | 94.16 | −0.09 | 0.74 | 0.75 | 96.61 | 2.15 | 1.35 | 82.17 | −0.57 |
| Sample 11 | 6 | 95.69 | −0.16 | 1.11 | 1.12 | 98.25 | 0.86 | 1.84 | 85.22 | −0.27 |
| Sample 11 | 7 | 95.46 | −0.18 | 1.19 | 1.21 | 98.8 | 1.09 | 2.08 | 84.65 | −0.29 |
| Sample 12 | 0 | 96.16 | −0.1 | 0.46 | 0.47 | 102.53 | 0 | 0.81 | 88.42 | −0.1 |
| Sample 12 | 1 | 96.23 | −0.17 | 0.99 | 1 | 99.91 | 0.67 | 1.12 | 86.11 | −0.28 |
| Sample 12 | 2 | 95.86 | −0.36 | 2 | 2.03 | 100.12 | 1.76 | 3.57 | 80.4 | −0.76 |
| Sample 12 | 3 | 94.74 | −0.53 | 3.54 | 3.58 | 98.45 | 3.42 | 6.27 | 72.15 | −1.29 |
| Sample 12 | 4 | 94.56 | −0.58 | 4.02 | 4.07 | 98.26 | 3.94 | 7.25 | 69.22 | −1.51 |
| Sample 12 | 5 | 92.72 | −0.43 | 3.05 | 3.08 | 98.09 | 4.32 | 5.88 | 67.61 | −1.37 |
| Sample 12 | 6 | 94.24 | −0.4 | 3.95 | 3.97 | 95.84 | 3.99 | 7.32 | 68.09 | −1.7 |
| Sample 12 | 7 | 94.09 | −0.35 | 3.81 | 3.83 | 95.22 | 3.94 | 6.96 | 69.07 | −1.64 |
| Sample 13 | 0 | 96.17 | −0.13 | 0.57 | 0.58 | 102.86 | 0 | 1.04 | 88.12 | −0.18 |
| Sample 13 | 1 | 96.36 | −0.13 | 1.01 | 1.02 | 97.36 | 0.48 | 1.96 | 85.32 | −0.44 |
| Sample 13 | 2 | 95.51 | −0.28 | 2.98 | 2.99 | 95.42 | 2.5 | 5.54 | 74.77 | −1.43 |
| Sample 13 | 3 | 94.2 | −0.69 | 5.83 | 5.87 | 96.75 | 5.65 | 10.59 | 60.09 | −2.41 |
| Sample 13 | 4 | 94.02 | −1.06 | 6.88 | 6.96 | 98.73 | 6.73 | 12.2 | 54.59 | −2.54 |
| Sample 13 | 5 | 92.06 | −0.98 | 5.89 | 5.97 | 99.43 | 6.78 | 10.83 | 53.23 | −2.13 |
| Sample 13 | 6 | 93.68 | −0.9 | 6.86 | 6.92 | 97.44 | 6.81 | 12.21 | 54.06 | −2.62 |
| Sample 13 | 7 | 93.44 | −0.71 | 6.59 | 6.62 | 96.17 | 6.63 | 12.04 | 54.28 | −2.82 |
| Sample 14 | 0 | 95.76 | −0.15 | 0.66 | 0.67 | 102.74 | 0 | 1.16 | 86.73 | −0.2 |
| Sample 14 | 1 | 94.43 | −0.18 | 0.99 | 1.01 | 100.5 | 0.75 | 1.77 | 86.15 | −0.3 |
| Sample 14 | 2 | 96.07 | −0.18 | 1.24 | 1.26 | 98.05 | 0.66 | 2.3 | 84.14 | −0.52 |
| Sample 14 | 3 | 95.26 | −0.14 | 1.22 | 1.23 | 96.72 | 0.75 | 2.15 | 83.78 | −0.78 |
| Sample 14 | 4 | 95.13 | −0.15 | 1.3 | 1.31 | 96.68 | 0.89 | 2.21 | 83.67 | −0.36 |
| Sample 14 | 5 | 93.51 | −0.17 | 0.93 | 0.95 | 100.32 | 2.26 | 1.65 | 79.19 | −0.38 |
| Sample 14 | 6 | 95.06 | 0.23 | 1.38 | 1.4 | 99.41 | 1.01 | 2.38 | 82.96 | −0.34 |
| Sample 14 | 7 | 95.04 | −0.2 | 1.42 | 1.43 | 97.97 | 1.05 | 2.51 | 82.53 | −0.38 |
| Sample 15 | 0 | 95.24 | −0.09 | 0.86 | 0.87 | 95.98 | 0 | 1.95 | 82.49 | −0.55 |
| Sample 15 | 1 | 95.41 | −0.15 | 1.22 | 1.22 | 97.17 | 0.4 | 1.92 | 84.2 | −0.36 |
| Sample 15 | 2 | 95.19 | −0.23 | 1.49 | 1.51 | 98.63 | 0.64 | 2.61 | 81.48 | −0.59 |
| Sample 15 | 3 | 94.62 | −0.21 | 1.55 | 1.56 | 97.7 | 0.94 | 2.56 | 81.32 | −0.51 |
| Sample 15 | 4 | 94.47 | −0.21 | 1.69 | 1.71 | 97.07 | 1.14 | 2.91 | 79.99 | −0.59 |
| Sample 15 | 5 | 92.71 | −0.17 | 1.24 | 1.25 | 97.7 | 2.56 | 2.46 | 75.53 | −0.59 |
| Sample 15 | 6 | 94.3 | −0.25 | 1.87 | 1.89 | 97.59 | 1.39 | 3.22 | 79.06 | −0.57 |
| Sample 15 | 7 | 94.5 | −0.28 | 1.83 | 1.85 | 98.86 | 1.23 | 3.06 | 80.02 | −0.48 |

TABLE 5D

Fabric Gas Fade Properties

| Sample | Pass | L* | a* | b* | C* | h* | delta E | YI | WI | Tint |
|---|---|---|---|---|---|---|---|---|---|---|
| Sample 16 | 0 | 96.01 | −0.13 | 0.35 | 0.37 | 109.55 | 0 | 0.59 | 89.18 | −0.08 |
| Sample 16 | 1 | 95.88 | −0.14 | 0.91 | 0.93 | 98.68 | 0.71 | 1.62 | 94.93 | −0.28 |
| Sample 16 | 2 | 95.45 | −0.23 | 1.2 | 1.23 | 100.99 | 1.02 | 1.99 | 84.71 | −0.38 |

TABLE 5D-continued

Fabric Gas Fade Properties

| Sample | Pass | L* | a* | b* | C* | h* | delta E | YI | WI | Tint |
|---|---|---|---|---|---|---|---|---|---|---|
| Sample 16 | 3 | 95.35 | −0.2 | 1.28 | 1.3 | 99.05 | 1.14 | 2.15 | 83.96 | −0.33 |
| Sample 16 | 4 | 95 | −0.23 | 1.41 | 1.43 | 99.13 | 1.47 | 2.47 | 82.68 | −0.39 |
| Sample 16 | 5 | 93.85 | −0.2 | 1.14 | 1.15 | 100.05 | 2.3 | 2.06 | 80.31 | −0.6 |
| Sample 16 | 6 | 95.11 | −0.28 | 1.76 | 1.78 | 98.94 | 1.68 | 3.05 | 80.94 | −0.48 |
| Sample 16 | 7 | 94.69 | −0.3 | 1.81 | 1.84 | 99.3 | 1.98 | 3.15 | 80.67 | −0.48 |
| Sample 17 | 0 | 96.22 | −0.12 | 0.5 | 0.52 | 103.64 | 0 | 0.88 | 84 | −0.17 |
| Sample 17 | 1 | 96.1 | −0.07 | 1.42 | 1.43 | 92.7 | 0.93 | 2.79 | 82.17 | −0.82 |
| Sample 17 | 2 | 94.67 | −0.04 | 2.82 | 2.82 | 90.72 | 2.79 | 5.48 | 74.61 | −1.88 |
| Sample 17 | 3 | 93.75 | −0.07 | 3.96 | 3.96 | 90.97 | 4.25 | 7.56 | 67.61 | −2.36 |
| Sample 17 | 4 | 93.96 | −0.41 | 4.73 | 4.75 | 95.01 | 4.81 | 8.84 | 64.09 | −2.41 |
| Sample 17 | 5 | 92.65 | −0.35 | 4.01 | 4.03 | 95.05 | 5.01 | 7.37 | 62.63 | −2.07 |
| Sample 17 | 6 | 93.43 | −0.16 | 4.76 | 4.77 | 91.86 | 5.09 | 8.93 | 63.17 | −2.64 |
| Sample 17 | 7 | 93.14 | 0.05 | 4.48 | 4.48 | 89.35 | 5.03 | 8.77 | 63.4 | −2.9 |
| Sample 18 | 0 | 95.67 | −0.13 | 0.56 | 0.58 | 103.15 | 0 | 1.07 | 86.39 | −0.21 |
| Sample 18 | 1 | 96.21 | −0.14 | 1.07 | 1.08 | 97.7 | 0.74 | 1.96 | 85.92 | −0.47 |
| Sample 18 | 2 | 95.58 | −0.07 | 1.66 | 1.66 | 92.51 | 1.11 | 3.17 | 82.43 | −1.04 |
| Sample 18 | 3 | 95.11 | −0.03 | 2.06 | 2.06 | 90.72 | 1.61 | 3.89 | 79.23 | −1.21 |
| Sample 18 | 4 | 94.92 | −0.17 | 2.29 | 2.3 | 94.27 | 1.89 | 4.24 | 78.36 | −1.1 |
| Sample 18 | 5 | 93.52 | −0.14 | 1.89 | 1.9 | 94.2 | 2.53 | 3.62 | 75.09 | −1.11 |
| Sample 18 | 6 | 94.88 | −0.15 | 2.44 | 2.45 | 93.48 | 2.04 | 4.55 | 77.17 | −1.18 |
| Sample 18 | 7 | 94.54 | −0.13 | 2.41 | 2.41 | 93.09 | 2.17 | 4.46 | 77.4 | −1.21 |
| Sample 19 | 0 | 96.09 | −0.1 | 0.4 | 0.41 | 104.39 | 0 | 0.7 | 88.18 | −0.12 |
| Sample 19 | 1 | 95.97 | −0.12 | 1.66 | 1.66 | 94 | 1.26 | 3.06 | 82.86 | −0.88 |
| Sample 19 | 2 | 94.65 | 0.01 | 3.51 | 3.51 | 89.92 | 3.42 | 7.01 | 69.03 | −2.36 |
| Sample 19 | 3 | 92.59 | −0.24 | 5.46 | 5.47 | 92.56 | 6.16 | 10.26 | 57.98 | −3.06 |
| Sample 19 | 4 | 92.54 | −0.42 | 5.99 | 6 | 94 | 6.63 | 10.88 | 56.37 | −3.02 |
| Sample 19 | 5 | 91.28 | −0.3 | 5.14 | 5.14 | 93.38 | 6.75 | 10.73 | 52.24 | −3.36 |
| Sample 19 | 6 | 92.65 | 0 | 5.47 | 5.47 | 90.05 | 6.12 | 10.47 | 58.02 | −3.46 |
| Sample 19 | 7 | 91.54 | 0.31 | 5.54 | 5.55 | 86.82 | 6.88 | 10.23 | 58.22 | −3.72 |
| Sample 20 | 0 | 96.09 | −0.12 | 0.56 | 0.57 | 102.64 | 0 | 0.91 | 88.69 | −0.18 |
| Sample 20 | 1 | 95.86 | −0.12 | 1.12 | 1.12 | 96.02 | 0.61 | 1.6 | 79.69 | −0.47 |
| Sample 20 | 2 | 95.23 | 0.02 | 1.88 | 1.88 | 89.39 | 1.58 | 3.29 | 80.88 | −1.17 |
| Sample 20 | 3 | 93.11 | 0.02 | 1.88 | 1.88 | 89.37 | 3.26 | 3.66 | 75.19 | −1.17 |
| Sample 20 | 4 | 94.53 | −0.03 | 2.33 | 2.33 | 90.8 | 2.37 | 4.44 | 76.72 | −1.39 |
| Sample 20 | 5 | 92.43 | −0.1 | 1.7 | 1.7 | 93.47 | 3.83 | 3.41 | 74 | −1.11 |
| Sample 20 | 6 | 94.61 | −0.08 | 2.34 | 2.34 | 91.84 | 2.32 | 4.13 | 74.99 | −1.05 |
| Sample 20 | 7 | 92.02 | −0.1 | 1.95 | 1.95 | 93.01 | 4.3 | 4.55 | 76.06 | −1.21 |

As illustrated in Table 5, Control 2 and Blends 11, 14, 15, 16, 18, 19, and 20 exhibited a YI of less than 5 after 5 days and also after 7 days.

The change in the sample's color properties over time was calculated using the data in Table 5 and is illustrated in Table 6 below. In Table 6 the absolute value of the change is reported, indicating the magnitude of the change in the sample's color properties.

TABLE 6

Change in Fabric Gas Fade Properties Over Time

| Sample | ΔL* After 5 Days | ΔL* After 7 Days | Δa* After 5 Days | Δa* After 7 Days | Δb* After 5 Days | Δb* After 7 Days | ΔYI After 5 Days | ΔYI After 7 Days |
|---|---|---|---|---|---|---|---|---|
| Control 1 | 5.04 | 5.25 | 1.83 | 0.77 | 10.2 | 10 | 18.45 | 19.38 |
| Control 2 | 1.9 | 0.77 | 0 | 0.04 | 0.44 | 0.77 | 1.01 | 1.31 |
| Sample 3 | 4.37 | 2.79 | 1.06 | 0.86 | 4.81 | 5.98 | 9.2 | 10.81 |
| Sample 4 | 4.4 | 3.94 | 1.34 | 0.9 | 7.97 | 8.55 | 14.41 | 15.64 |
| Sample 5 | 4.85 | 3.54 | 1.44 | 1.58 | 6.54 | 9.33 | 11.49 | 16.34 |
| Sample 6 | 3.76 | 3.54 | 2.26 | 2.46 | 9.41 | 12.14 | 14.97 | 20.83 |
| Sample 7 | 3.56 | 2.19 | 0.61 | 0.62 | 2.12 | 3.35 | 4.42 | 5.91 |
| Sample 8 | 3.53 | 4.49 | 2.72 | 3.45 | 5.69 | 7.55 | 8.54 | 11.37 |
| Sample 9 | 2.88 | 2.75 | 1.88 | 2.5 | 4.01 | 5.43 | 6.26 | 8.07 |
| Sample 10 | 3.97 | 3.29 | 1.1 | 1.3 | 3.37 | 4.23 | 7.48 | 9.01 |
| Sample 11 | 2.14 | 0.84 | 0.03 | 0.06 | 0.24 | 0.69 | 0.52 | 1.25 |
| Sample 12 | 3.44 | 2.07 | 0.33 | 0.25 | 2.59 | 3.35 | 5.07 | 6.15 |
| Sample 13 | 4.11 | 2.73 | 0.85 | 0.58 | 5.32 | 6.02 | 9.79 | 11 |
| Sample 14 | 2.25 | 0.72 | 0.02 | 0.05 | 0.27 | 0.76 | 0.49 | 1.35 |
| Sample 15 | 2.53 | 0.74 | 0.08 | 0.19 | 0.38 | 0.97 | 0.51 | 1.11 |
| Sample 16 | 2.16 | 1.32 | 0.07 | 0.17 | 0.79 | 1.46 | 1.47 | 2.56 |
| Sample 17 | 3.57 | 3.08 | 0.23 | 0.17 | 3.51 | 3.98 | 6.49 | 7.89 |

TABLE 6-continued

Change in Fabric Gas Fade Properties Over Time

| Sample | ΔL* After 5 Days | ΔL* After 7 Days | Δa* After 5 Days | Δa* After 7 Days | Δb* After 5 Days | Δb* After 7 Days | ΔYI After 5 Days | ΔYI After 7 Days |
|---|---|---|---|---|---|---|---|---|
| Sample 18 | 2.15 | 1.13 | 0.01 | 0 | 1.33 | 1.85 | 2.55 | 3.39 |
| Sample 19 | 4.81 | 4.55 | 0.2 | 0.41 | 4.74 | 5.14 | 10.03 | 9.53 |
| Sample 20 | 3.66 | 4.07 | 0.02 | 0.02 | 1.14 | 1.39 | 2.5 | 3.64 |

As seen in Table 6, Control 2 and Blends 7, 11, 14, 15, 16, 18, and 20 had a ΔYI after 5 days of less than 5. However, only Control 2 and Blends 11, 14, 15, 16, 18, and 20 exhibited a ΔYI after 7 days of less than 5. As seen in Table 6 and FIG. 4, Control 2 and Blends 11, 14, and 15 exhibited a ΔYI after 7 days of less than 2. As also seen in Table 6, Control 2 and Blends 11, 12, 14, 15, 16, 17, 18, 19, and 20 exhibited a Δa* after 7 days of less than 0.5. However, only Control 2 and Blends 11, 14, 18, and 20 exhibited a Δa* after 7 days of less than 0.1.

Figure 5:
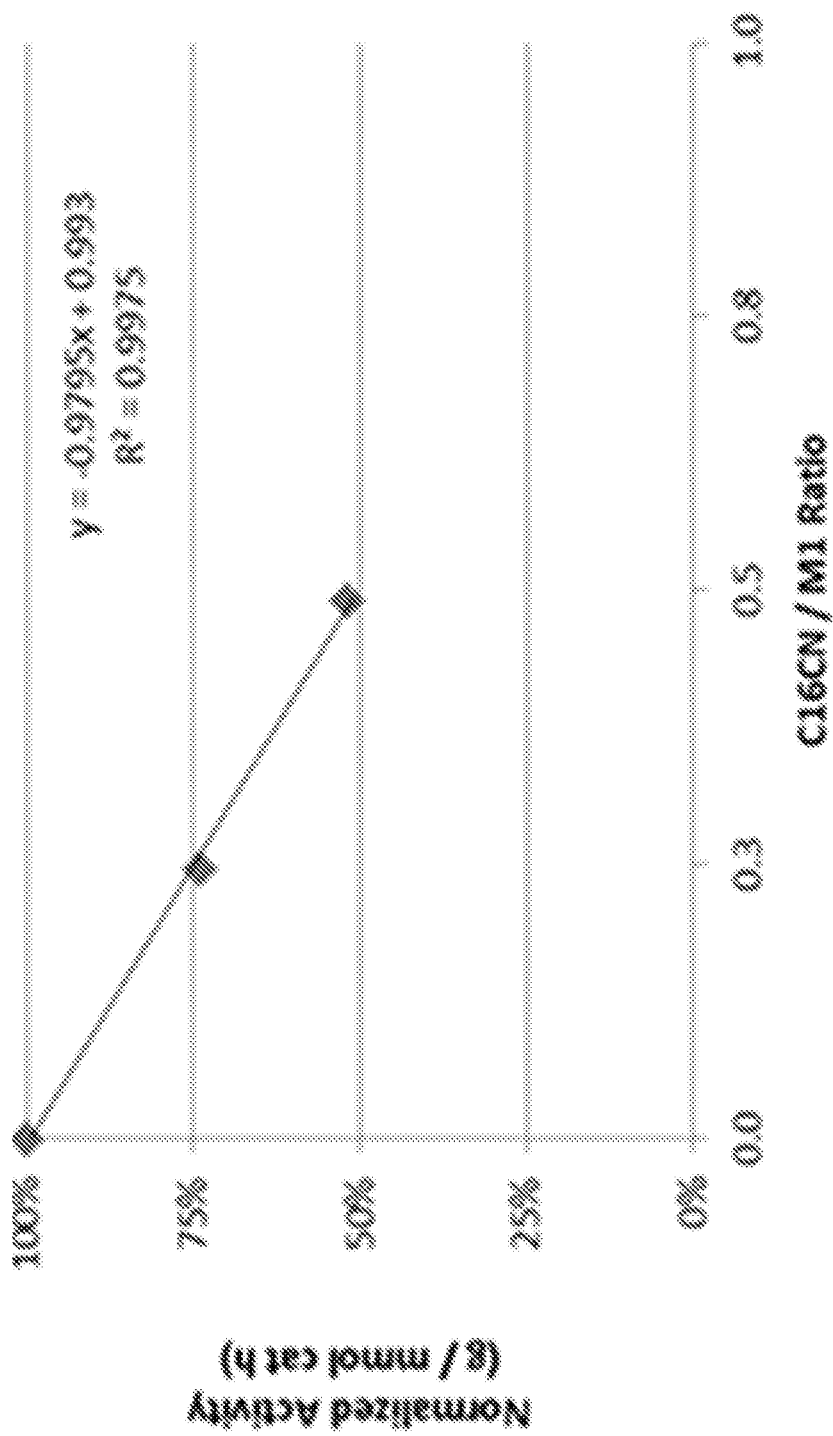
FIG. 5 illustrates the interaction between nitrile degradation products from amine-based stabilizers and polymerization catalysts.

In order to assess the effect of by-products emanated by the degradation of the Genox™ EP stabilizer on the polymerization catalyst, a study was undertaken wherein a stociometrically measured amount of the by-product (nitrile) was introduced into a batch reactor in the presence of the catalyst. The catalyst activity was measured at each concentration of the nitrile by-product. FIG. 5 shows the effect of increasing levels of nitrile by-product on the normalized catalyst efficiency. As seen in FIG. 5, the catalyst efficiency decreases with increasing nitrile content, but does not drop precipitously when a trace level of nitrile is present. These results indicate that the by-product by themselves are not catalyst poisons, an important consideration for the use of the stabilizer in the processes described herein.

As illustrated in the above described examples, the compositions exhibited different process, color, and product stability properties. Blends 11 and 14, which contained the amine oxide antioxidant Genox™ EP, exhibited the best balance of process stability and color stability as evidenced by the MFR Multi-Pass Test and the ΔYI.

Control Sample 2 which did not contain any stabilizer/antioxidant exhibited good color stability, however had poor processability as demonstrated by the high ΔMFR in the MFR Multi-Pass Test. Conversely, Control Sample 1 and Blends 3, 4, 5, 6, 8, and 9 which contained only phenolic antioxidant stabilizers (Irganox™ 1076, Irganox™ 1010, or Good-rite™ 3114) exhibited good process stability in the MFR Multi-Pass Test but exhibited poor color stability as those samples exhibited ΔYI of over 5. Likewise, Blends 7 and 10, which contained Irgastab™ FS 301, which is a blend of a primary antioxidant and a secondary antioxidant, exhibited good process stability but poor color stability.

Blends 15 and 16 which contained Irgastab™ FS 042 had adequate color stability and process stability. However, Irgastab™ FS 042 is an tallow-based antioxidant which is animal derived. Therefore, Irgastab™ FS 042 may not be suitable for all end-use applications. Blends 12 and 13 which contained a blend of Irganox™ 1076 and Irgastab™ FS042 exhibited poor color stability as indicated by the ΔYI.

Blends 17 and 19 which contained a blend of Irganox™ 1076 and Genox™ EP, with the phenolic antioxidant being the majority antioxidant, also exhibited poor color stability as indicated by the ΔYI. Blends 18 and 20 which contained a blend of Irganox™ 1076 and Genox™ EP with the amine oxide antioxidant being the majority antioxidant exhibited good process stability and adequate color stability. However, while Blends 18 and 20 exhibited a ΔYI of less than 5, it was still greater than 2 and thus would be perceptible to the human eye.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A process for producing propylene-based polymer pellets comprising:
  (a) combining propylene, α-olefin, and a catalyst in a reactor to form a polymer-containing polymerization reaction mixture;
  (b) downstream of the reactor, separating the polymer-containing polymerization reaction mixture into a polymer-rich liquid phase and a polymer-lean liquid phase;
  (c) separating the polymer-rich phase from the polymer-lean phase and exposing the polymer-rich phase to a pressure reduction to cause flashing of the polymer-rich phase to form a solvent-containing vapour phase and a concentrated polymer phase;

(d) introducing a stabilizer selected from a liquid amine oxide stabilizer and a solution of amine oxide stabilizer to the concentrated polymer phase;

(e) exposing the concentrated polymer phase to a vacuum to further reduce the concentration of volatile components in the concentrated polymer phase;

(f) forming a polymer melt from the concentrated polymer phase; and (g) cooling and pelletizing the polymer melt to form propylene-based polymer pellets.

2. The process of claim 1, wherein step (d) occurs before step (e).

3. The process of claim 1, wherein step (d) occurs simultaneously with step (e).

4. The process of claim 1, wherein the stabilizer in step (d) is a solution of amine oxide stabilizer.

5. The process of claim 4, wherein the solvent in the amine oxide stabilizer solution comprises toluene or hexane.

6. The process of claim 4, wherein the amine oxide stabilizer solution comprises at least 1 wt % of amine oxide.

* * * * *